United States Patent
Anzai et al.

(10) Patent No.: US 11,820,165 B2
(45) Date of Patent: Nov. 21, 2023

(54) PRINTED OBJECT

(71) Applicant: DAI NIPPON TORYO CO., LTD., Osaka (JP)

(72) Inventors: Yasuhiro Anzai, Tochigi (JP); Naoyuki Masuda, Tochigi (JP); Akira Suetsugu, Tochigi (JP); Shinya Sakaguchi, Aichi (JP); Mami Saito, Tochigi (JP)

(73) Assignee: DAI NIPPON TORYO CO., LTD., Osaka (JP)

(*) Notice: Subject to any disclaimer, the term of this patent is extended or adjusted under 35 U.S.C. 154(b) by 407 days.

(21) Appl. No.: 17/040,366

(22) PCT Filed: Mar. 27, 2019

(86) PCT No.: PCT/JP2019/013322
§ 371 (c)(1),
(2) Date: Sep. 22, 2020

(87) PCT Pub. No.: WO2019/189443
PCT Pub. Date: Oct. 3, 2019

(65) Prior Publication Data
US 2021/0023868 A1 Jan. 28, 2021

(30) Foreign Application Priority Data

Mar. 30, 2018 (JP) ................................ 2018-069681
Jun. 19, 2018 (JP) ................................ 2018-116088

(51) Int. Cl.
*B41M 5/52* (2006.01)
*B41J 2/01* (2006.01)
(Continued)

(52) U.S. Cl.
CPC .......... *B41M 5/5209* (2013.01); *B32B 27/00* (2013.01); *B41J 2/01* (2013.01); *B41M 5/52* (2013.01); *C09D 5/00* (2013.01); *C09D 11/101* (2013.01); *C09D 11/30* (2013.01); *C09D 11/36* (2013.01); *C09D 11/54* (2013.01); *B41M 5/5218* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

2003/0021961 A1 1/2003 Ylitalo et al.
2003/0138604 A1* 7/2003 Landry-Coltrain .... B41M 5/502
428/195.1
(Continued)

FOREIGN PATENT DOCUMENTS

CN 103442813 A 6/2016
EP 2 965 904 1/2016
(Continued)

OTHER PUBLICATIONS

International Search Report for PCT/JP2019/013322 dated Jun. 25, 2019, 9 pages, with English Translation.
(Continued)

*Primary Examiner* — Manish S Shah
(74) *Attorney, Agent, or Firm* — NIXON & VANDERHYE

(57) ABSTRACT

Disclosed is a printed object which, even if using a receptive layer that is difficult for a monomer in an active energy ray curable ink to penetrate, has excellent adhesion between the active energy ray curable ink and the receptive layer, and in which the amount of unreacted monomer dissipated from the printed object is low. This printed object includes an ink receptive layer laminated on a substrate surface and having an ink absorption rate of 100% or less, and an ink layer laminated on a surface of the ink receptive layer and made from an active energy ray curable ink which includes a polymerizable compound, wherein the glass transition temperature of the polymerizable compound is −45-25° C.

8 Claims, No Drawings

(51) Int. Cl.
*C09D 11/101* (2014.01)
*C09D 11/36* (2014.01)
*C09D 11/54* (2014.01)
*C09D 11/30* (2014.01)
*B32B 27/00* (2006.01)
*C09D 5/00* (2006.01)

(52) U.S. Cl.
CPC ......... *B41M 5/5227* (2013.01); *B41M 5/5254* (2013.01)

(56) References Cited

U.S. PATENT DOCUMENTS

| | | | |
|---|---|---|---|
| 2004/0129677 A1* | 7/2004 | Portner | C23C 18/24 216/108 |
| 2004/0191529 A1* | 9/2004 | Gillie | B32B 27/18 428/522 |
| 2007/0264457 A1* | 11/2007 | Matsushita | C09J 7/29 428/41.6 |
| 2008/0084466 A1 | 4/2008 | Makuta et al. | |
| 2012/0021193 A1 | 1/2012 | Lecolley et al. | |
| 2012/0171915 A1* | 7/2012 | Bartholomew | C09J 7/385 524/561 |
| 2014/0004369 A1 | 1/2014 | Anzai et al. | |
| 2014/0160215 A1* | 6/2014 | Saito | B41M 5/0047 522/167 |
| 2016/0145465 A1 | 5/2016 | Furutaka et al. | |
| 2016/0250800 A1* | 9/2016 | Sumi | B29C 48/09 264/210.6 |
| 2018/0371271 A1* | 12/2018 | Ojima | B41M 5/0047 |

FOREIGN PATENT DOCUMENTS

| | | |
|---|---|---|
| JP | 2004-532144 | 10/2004 |
| JP | 2005/154537 | 6/2005 |
| JP | 2008-087244 | 4/2008 |
| JP | 2008-105376 | 5/2008 |
| JP | 2010/112073 | 5/2010 |
| JP | 2010-167334 | 8/2010 |
| JP | 2010/208042 | 9/2010 |
| JP | 2012/522713 | 9/2012 |
| JP | 2013/63570 | 4/2013 |
| JP | 2014/172271 | 9/2014 |
| JP | 2015-085686 | 5/2015 |
| WO | 02/085638 | 10/2002 |
| WO | 2010/115858 | 10/2010 |
| WO | 2012/133667 | 10/2012 |
| WO | 2014/203853 | 12/2014 |
| WO | 2016/104423 | 6/2016 |
| WO | 2017/119265 | 7/2017 |
| WO | WO-2017119265 A1 * | 7/2017 ................ B41J 2/01 |

OTHER PUBLICATIONS

Written Opinion of the ISA for PCT/JP2019/013322 dated Jun. 25, 2019, 5 pages.

* cited by examiner

PRINTED OBJECT

CROSS-REFERENCE TO RELATED APPLICATIONS

This application is the U.S. national phase of International Application No. PCT/JP2019/013322 filed Mar. 27, 2019 which designated the U.S. and claims priority to Japanese Application No. 2018-069681 filed Mar. 30, 2018 and Japanese Application No. 2018-116088 filed Jun. 19, 2018, the entire contents of each of which are hereby incorporated by reference.

TECHNICAL FIELD

The present invention relates to a printed matter formed by laminating an ink layer comprising an actinic radiation-curable ink on a surface of an ink-receiving layer, and also relates to a printed matter formed by laminating an ink layer comprising the actinic radiation-curable ink and a surface protecting layer on a substrate.

BACKGROUND ART

Conventionally, a printing method using an inkjet printer has been utilized for decorating a substrate such as plastics or building boards. With regard to applying decorations using an inkjet printer, it is common practice to provide a substrate with an ink-receiving layer and perform printing on the ink-receiving layer, rather than to directly print an ink on the substrate. Recently, an actinic radiation-curable ink having a short curing time and excellent productivity has attracted attention, and a printing system using an actinic radiation-curable ink has been developed.

The ink-receiving layer to which an actinic radiation-curable ink is applied is disclosed, for example, in Patent Documents 1 and 2. More specifically, Patent Document 1 discloses a coating material for a receiving layer which is an acrylic resin emulsion having a calculated glass transition point Tg of 35 of 90° C. In addition, Patent Document 2 discloses an emulsion coating material of a thermoplastic resin containing a crosslinking agent as a coating material for a receiving layer.

In addition, such a substrate including a building board or a colored plate may be accompanied by a unique odor for a period of time not long after production, and a reduction in odor of ink or printed matter is required. In particular, reduction in a dissipation amount of monomers contained in the ink used has been a problem. Patent Document 3 discloses an ink in which monomer odor is reduced by adjusting contents of a monomer and a photopolymerization initiator contained in the ink. Patent Document 4 discloses suppression of monomer odor by providing an ozone generating means in an ink application unit.

Patent Document 1: Japanese Unexamined Patent Application, Publication No. 2010-112073
Patent Document 2: Japanese Unexamined Patent Application, Publication No. 2013-63570
Patent Document 3: Japanese Unexamined Patent Application, Publication No. 2005-154537
Patent Document 4: Japanese Unexamined Patent Application, Publication No. 2010-208042

DISCLOSURE OF THE INVENTION

Problems to be Solved by the Invention

When printing using an actinic radiation-curable ink is performed on a receiving layer obtained from a conventional coating material for a receiving layer, monomers in the actinic radiation-curable ink remain in the receiving layer or an ink layer in an uncured state, and unreacted monomers may be dissipated from a product after applying a decoration comprising the receiving layer or ink layer.

In particular, when printing is performed on an absorbent substrate or on an ink-receiving layer, monomers in the actinic radiation-curable ink tend to remain not only in the ink layer but also in the receiving layer in the uncured state. Thus, a large amount of unreacted monomer is easily dissipated from the product after applying a decoration.

In addition, when printing is performed using an actinic radiation-curable ink, dots do not easily spread on conventional receiving layers, and it is difficult to achieve good chromogenic properties of an image. On the other hand, there is also a method of forming a dense receiving layer so that monomers in the actinic radiation-curable ink do not permeate into the receiving layer, but in this case, an adhesion force due to an anchoring effect cannot be easily obtained.

In addition, from a viewpoint of the actinic radiation-curable ink, as a method of reducing unreacted monomers after ink curing, there is a method of adjusting contents of a monomer and a photopolymerization initiator and a method of increasing an amount of radiation energy, but these methods alone are not sufficient to reduce unreacted monomers remaining in the receiving layer.

Further, since, in these methods, an excessive amount of photopolymerization initiator is used or an excessive amount of radiation energy is required, these methods are wasteful and there is a possibility in some cases that a film property such as weather resistance or chromogenic property of the ink film may be deteriorated.

In addition, although there is a method of using a monomer with little odor, freedom in design of such the ink cannot be sufficiently obtained, and it may be difficult for even this method to sufficiently satisfy film characteristics such as weather resistance or chromogenic property of the ink film. Further, although a method of providing an ozone generating means in an ink coating unit is also disclosed, there is a concern that this may increase the cost of the manufacturing facility.

The present invention was made in view of the above problems, and it is an object of the present invention to provide a printed matter which dissipates a small amount of unreacted monomers and which is excellent in adhesiveness between an actinic radiation-curable ink and a receiving layer, even when as the receiving layer, a receiving layer into which monomers in the actinic radiation-curable ink do not easily permeate is used.

Means for Solving the Problems

The present inventors have found that the object of the present invention is achieved by the following.

A first aspect of the present invention relates to a printed matter formed by laminating an ink-receiving layer having an ink absorption rate of 100% or less on a surface of a substrate, and laminating an ink layer comprising an actinic radiation-curable ink containing a polymerizable compound on a surface of the ink-receiving layer, in which the polymerizable compound has a glass transition temperature of −45° C. to 25° C. A second aspect of the present invention relates to the printed matter as described in the first aspect, in which the ink-receiving layer comprises a polymer containing at least one structural unit derived from an ethylenically unsaturated monomer having a solubility parameter of 9.50 to 13.0 in a content of 25 to 85% by mass. A third aspect of the present invention relates to the printed matter as described in the first or second aspect, in which an elongation rate of the ink-receiving layer is 10 to 30%. A fourth aspect of the present invention relates to the printed matter as described in any one of the first to third aspects, in which a ratio of a monofunctional monomer contained in the polymerizable compound is 50% by mass or more. A fifth aspect of the present invention relates to a printed matter comprising an ink layer comprising an actinic radiation-curable ink containing a polymerizable compound over a substrate, and a surface protecting layer laminated on the ink layer, in which a monomer dissipation rate of the ink layer is 10.0 µg/m²·hr or less and the monomer dissipation rate after the surface protecting layer is laminated is 1.0 µg/m²·hr or less. A sixth aspect of the present invention relates to the printed matter as described in the fifth aspect, in which the ink layer is provided on an ink-receiving layer comprising a polymer containing at least one structural unit derived from an ethylenically unsaturated monomer having a solubility parameter (hereinafter also referred to as SP value) of 9.50 to 13.0, in a content of 25 to 85% by mass. A seventh aspect of the present invention relates to the printed matter as described in the fifth or sixth aspect, in which a ratio of a monofunctional monomer contained in the polymerizable compound is 50% by mass or more. An eighth aspect of the present invention relates to the printed matter as described in any one of the fifth to seventh aspects, in which an absolute value of a difference between a mass average value of solubility parameters of ethylenically unsaturated monomers, as the polymerizable compound, forming the ink layer and an SP value of an organic solvent component contained in a surface protecting layer forming composition is 0.70 or less.

According to the present invention, it is possible to provide a printed matter which is composed of an actinic radiation-curable ink and which dissipates a small amount of unreacted monomers, and in particular, a printed matter which dissipates a small amount of unreacted monomers and which is excellent in adhesiveness between an actinic radiation-curable ink and a receiving layer, even when as the receiving layer, a receiving layer into which monomers in the actinic radiation-curable ink do not easily permeate is used.

PREFERRED MODE FOR CARRYING OUT THE INVENTION

Hereinafter, embodiments of the present invention will be described in detail.
<Printed Matters>

The present invention relates to a printed matter formed by laminating an ink-receiving layer having an ink absorption rate of 100% or less on a surface of a substrate, and laminating an ink layer comprising an actinic radiation-curable ink containing a polymerizable compound on a surface of the ink-receiving layer, characterized in that the polymerizable compound has a glass transition temperature of −45° C. to 25° C.

Further, the present invention relates to a printed matter comprising an ink layer comprising an actinic radiation-curable ink containing a polymerizable compound on a substrate, and a surface protecting layer laminated on the ink layer, characterized in that a monomer dissipation rate of the ink layer is 10.0 µg/m²·hr or less and the monomer dissipation rate after the surface protecting layer being laminated is 1.0 µg/m²·hr or less.

«Ink-Receiving Layer»

In the present invention, the ink layer comprising an actinic radiation-curable ink containing a polymerizable compound may be directly formed on a substrate, but it is preferred to provide an ink-receiving layer from a viewpoint of adhesiveness between the substrate and the ink layer and chromogenic properties of the ink layer.

The ink-receiving layer of the present invention can be formed by applying a coating material for ink-receiving layer on a surface of a substrate and curing it. The coating material for ink-receiving layer of the present invention contains an aqueous dispersion of resin particles containing a resin. As this resin, it is preferred to use a resin comprising a structural unit derived from a monomer having a cyclic structure in a ratio of more than 0 and 28% by mass or less.

The above resin is not particularly limited, and examples thereof include a polymer containing a structural unit derived from a monomer having no cyclic structures, and a polymer containing a structural unit derived from a monomer having no cyclic structures and a structural unit derived from a monomer having a cyclic structure. Each of the structural unit derived from a monomer having no cyclic structures and the structural unit derived from a monomer having a cyclic structure may be used alone or in combination of two or more types thereof.

Examples of the monomer having a cyclic structure include an alicyclic group-containing unsaturated hydrocarbon, an aromatic ring-containing unsaturated hydrocarbon, an alicyclic group-containing unsaturated carboxylic acid, an alicyclic group-containing unsaturated carboxylic acid ester, an alicyclic group-containing unsaturated carboxylic acid amide, an aromatic ring-containing unsaturated carboxylic acid, an aromatic ring-containing unsaturated carboxylic acid ester, an aromatic ring-containing unsaturated carboxylic acid amide, an alicyclic group-containing alkoxysilane, an aromatic ring-containing alkoxysilane, etc. The alicyclic group and the aromatic ring may have a hetero atom such as a nitrogen atom or an oxygen atom in the ring, or may have a substituent.

The alicyclic group is not particularly limited, and examples thereof include an alicyclic hydrocarbon group such as a cycloalkyl group (e.g., a cyclohexyl group) and a cycloalkenyl group (e.g., a cyclohexenyl group); and an alicyclic heterocyclic group such as a piperidyl group. The aromatic ring is not particularly limited, and examples thereof include aromatic carbocycles such as a benzene ring, a naphthalene ring, and an anthracene ring; and aromatic heterocycles such as a pyridine ring.

Examples of the alicyclic group-containing unsaturated hydrocarbon include vinylcyclohexane and the like. Examples of the aromatic ring-containing unsaturated hydrocarbon include styrene and the like. Examples of the alicyclic group-containing unsaturated carboxylic acid include 3-cyclohexylacrylic acid and the like. Examples of the alicyclic group-containing unsaturated carboxylic acid ester include cyclohexyl (meth) acrylate, glycidyl methacrylate, 1,2,2,6,6-pentamethyl-4-piperidylmethacrylate, and the like.

Examples of the alicyclic group-containing unsaturated carboxylic acid amide include N-cyclohexyl (meth)acrylamide and the like. Examples of the aromatic ring-containing unsaturated carboxylic acid include 3-phenyl(meth)acrylic acid and the like. Examples of the aromatic ring-containing unsaturated carboxylic acid ester include phenyl (meth) acrylate and the like. Examples of the aromatic ring-containing unsaturated carboxylic acid amide include N-phenyl (meth)acrylamide and the like. Examples of the alicyclic group-containing alkoxysilane include 3-glycidoxypropyltrimethoxysilane, 3-glycidoxypropyltriethoxysilane, etc.

Examples of the aromatic ring-containing alkoxysilane include 3-phenoxypropyltrimethoxysilane and 3-phenoxypropyltriethoxysilane, etc. From a viewpoint of the chromogenic property of the ink-receiving layer, etc., cyclohexyl methacrylate, styrene, glycidyl methacrylate, 3-glycidoxypropyltriethoxysilane, 1,2,2,6,6-pentamethyl-4-piperidylmethacrylate and the like are preferred.

Examples of the monomer having no cyclic structures include, but are not limited thereto, linear or branched unsaturated hydrocarbons, linear or branched unsaturated carboxylic acids, linear or branched unsaturated carboxylic acid esters, and linear or branched unsaturated carboxylic acid amides, etc. Examples of the linear or branched unsaturated hydrocarbons include ethylene, propylene, etc. Examples of the linear or branched unsaturated carboxylic acids include (meth) acrylic acid, etc.

Examples of the linear or branched unsaturated carboxylic acid esters include alkyl (meta)acrylates such as methyl (meta)acrylate, ethyl (meta)acrylate, butyl (meta)acrylate, 2-ethylhexyl (meta)acrylate, etc.; alkenyl (meta)acrylates such as allyl (meta)acrylate, etc.; and 3-(meta)acryloyloxypropyltrialkoxysilanes such as 3-(meta)acryloyloxypropyltrimethoxysilane, 3-(meta)acryloyloxypropyltriethoxysilane, etc. Examples of the linear or branched unsaturated carboxylic acid amides include diacetone (meth) acrylamide, etc.

As the monomer having no cyclic structures, methyl methacrylate, ethyl acrylate, butyl acrylate, 2-ethylhexyl acrylate, butyl methacrylate, methacrylic acid, diacetone acrylamide, 3-methacryloyloxypropyltrimethoxysilane, and allyl methacrylate are preferred.

In this specification, (meth) acrylic acid refers to acrylic acid or methacrylic acid, (meth) acrylates refer to acrylates or methacrylates, and (meth)acrylamides refer to acrylamides or methacrylamides.

In the above resins, the ratio of the structural unit derived from a monomer having a cyclic structure is more than 0 and 28% by mass or less, preferably from 0.01 to 26% by mass, and more preferably from 0.1 to 25% by mass. The presence of a small amount of the monomer having a cyclic structure can be expected to be effective in adjusting a dot diameter.

The resin is a polymer which contains at least one structural unit derived from an ethylenically unsaturated monomer having a solubility parameter of from 9.50 to 13.0, preferably in a content of from 25 to 85% by mass. Note that, in this specification, the ethylenically unsaturated monomer refers to a monomer having a double bond in a molecule and undergoing a polymerization reaction through addition to the double bond. The ethylenically unsaturated monomer is not particularly limited, and examples thereof include those which are exemplified above as the monomer having no cyclic structures and the monomer having a cyclic structure, and have the above-described double bond.

The calculated glass transition temperature of the above resin is preferably from −15 to 85° C., more preferably from −10 to 50° C., and most preferably from −5 to 40° C., from a viewpoint of reducing unreacted monomers. When the above calculated glass transition temperature is −15° C. or more, sticky feel does not easily remain after drying. When the above calculated glass transition temperature is 85° C. or less, drying does not easily become slow. In this specification, the calculated glass transition temperature refers to a glass transition temperature calculated by the equation of Fox.

The aqueous dispersion of resin particles containing the above resin can be produced, for example, by subjecting a monomer having no cyclic structures or a combination of a monomer having no cyclic structures and a monomer having a cyclic structure, etc. to emulsion polymerization in an aqueous medium containing water as a main component, according to a conventional method.

The content of the above resin is preferably 10 to 60% by mass, and more preferably 20 to 45% by mass, with respect to the component forming the ink-receiving layer. When the content is 10 to 60% by mass, the monomers do not easily remain after printing, and the adhesiveness between the ink-receiving layer and the ink layer or between the ink-receiving layer and a clear layer can be enhanced with excellent performance of the chromogenic property being maintained.

In addition to the water dispersion described above, the coating material for ink-receiving layer according to the present invention may include a pigment. The pigment is not particularly limited, and examples thereof include a coloring pigment (e.g., a white pigment), a rust preventive pigment and an extender pigment commonly used in the coating industry.

Examples of the coloring pigment, the rust preventing pigment, and the extender pigment include inorganic pigments such as titanium oxide, red iron oxide, yellow iron oxide, carbon black, aluminum tripolyphosphate, zinc phosphate, condensed aluminum phosphate, barium metaborate, calcium carbonate, barium sulfate, kaolin, talc, clay, mica, alumina, alum, white earth, magnesium hydroxide, magnesium oxide, etc.; and organic pigments such as phthalocyanine blue, phthalocyanine green, naphthol red, quinacridone red, benzimidazolone yellow, Hansa yellow, benzimidazolone orange and dioxazine violet, etc. The pigment may be used alone or in combination of two or more types thereof.

The content of the above pigment is preferably 35 to 85% by mass, more preferably 40 to 75% by mass, with respect to the component forming the ink-receiving layer. When the content is 35 to 85% by mass, monomers do not easily remain after printing is performed, and adhesiveness between the ink-receiving layer and the ink layer or between the ink-receiving layer and a clear layer can be enhanced with excellent performance of the chromogenic property being maintained.

The coating material for ink-receiving layer according to the present invention may further comprise a film forming aid. From a viewpoint of film formability, the content of the film forming aid is preferably 0 to 10% by mass with respect to the above coating material.

In addition to the components described above, additives commonly used in the coating material industry, such as a photopolymerization initiator, a photo stabilizer, a polymerization inhibitor, an organic solvent, an antioxidant, a silane coupling agent, a plasticizer, a defoaming agent, a surface modifier, a wet dispersant, a rheology control agent, an ultraviolet absorber, a viscosity modifier, a preservative, etc. may be appropriately selected and formulated to the coating material for ink-receiving layer according to the present invention, within a range that does not harm the object of the present invention.

An ink absorption rate of a coating film composed of a dried material of the coating material for ink-receiving layer according to the present invention is 100% or less, preferably 90% or less, and more preferably 85% or less. When the above ink absorption rate is 100% or less, an amount of a monomer in the actinic radiation-curable ink remaining in the receiving layer in an uncured state can be reduced, and it is possible to effectively suppress generation of odor from the product after applying a decoration comprising the receiving layer. Note that, in this specification, the ink absorption rate refers to an amount measured by the method described in the Examples.

Further, by adjusting elongation rate of the coating film composed of the dried material of the coating material for ink-receiving layer according to the present invention to 10% or more, toughness of the coating film tends to be obtained. The elongation rate of a coating film can be adjusted by the content of a pigment or intermolecular crosslinking density of the resin, which are described below.

In the above resin particles in the coating material for ink-receiving layer according to the present invention, crosslinking is preferably present between molecules of the above resin. When crosslinking is present between molecules of the above resin, (1) as the crosslinking density increases, penetration of the actinic radiation-curable ink into the ink-receiving layer is more easily suppressed, so that it is easy to reduce the amount of monomers which remain in the above ink in the receiving layer in an uncured state, resulting in effective suppression of generation of odor from the product after applying a decoration comprising the receiving layer, and (2) dissolution resistance of the ink-receiving layer to the above monomer or the solvent is easily improved.

Crosslinking between molecules of the above resin can be introduced by using a crosslinkable monomer, for example, 3-methacryloyloxypropyltrimethoxysilane, 3-glycidoxypropyltrimethoxysilane, glycidyl methacrylate, allyl methacrylate, etc., in combination as a raw material monomer in producing the above resin. For example, the epoxy group reacts with a carboxyl group such as acrylic acid or methacrylic acid, etc. The crosslinkable monomer used for introducing crosslinking between molecules of the above resin may be used alone or in combination of two or more types.

In the coating material for ink-receiving layer according to the present invention, it is preferable that crosslinking is present between the above particles. When crosslinking is present between the above particles, as the crosslinking density increases, penetration of the actinic radiation-curable ink into the ink-receiving layer is suppressed, so that it is easy to reduce the amount of the monomer in the above ink remaining in the receiving layer in an uncured state, resulting in effective suppression of generation of odor from the product after applying a decoration comprising the receiving layer. The crosslinking between the above particles can be introduced by using a crosslinkable monomer, for example, diacetone acrylamide, N-(butoxymethyl)acrylamide, etc., in combination as a raw material monomer in producing the above resin.

Examples of the crosslinking between particles include that introduced via a crosslinking agent such as a compound having an oxazoline group, adipic acid dihydrazide, etc. and that introduced by self-crosslinking between the resins. When a compound having an oxazoline group is used, carboxyl groups in the resin participate in a crosslinking reaction. When adipic acid dihydrazide is used, the carbonyl groups in the resin participate in the crosslinking reaction.

When N-(butoxymethyl)acrylamide is contained in the raw material monomer, a butoxy group is eliminated by heating, and after a methylol group is generated, the resins present on different particles are self-crosslinked. Each of the crosslinkable monomers and the crosslinking agent used for introducing crosslinking between particles may be used alone or in combination of two or more types.

«Monomer Dissipation Rate»

In the present invention, a monomer dissipation rate of the ink layer is 10.0 μg/m²·hr or less, and the monomer dissipation rate after a surface protecting layer being provided is 1.0 μg/m²·hr or less. Even though a monomer diffusion rate of the ink layer of the present invention is 10.0 μg/m²·hr, a monomer dissipation rate of 1.0 μg/m²·hr or less can be achieved by providing a surface protecting layer and setting an absolute value of a difference between a mass average value of SP values of monomers contained in the ink layer and an SP value of an organic solvent component contained in a surface protecting layer forming composition to 0.70 or less. In particular, when an ink-receiving layer is further used, the effect is remarkable.

«Ink Layer»

The ink layer of the present invention can be formed by printing an actinic radiation-curable ink on an ink-receiving layer to be described below, for example, by a printing means such as printing by an inkjet printer, i.e., an inkjet method, and then curing the ink. A thickness of the ink layer is not particularly limited, and is, for example, 5 to 50 μm.

Examples of the actinic radiation used for curing in the present invention include a metal halide lamp, a high pressure mercury lamp, or an ultraviolet ray LED. The wavelength of the actinic radiation to be radiated preferably overlaps with the absorption wavelength of the photopolymerization initiator, and the principal wavelength of the actinic radiation is preferably in the range of 360 to 425 nm.

«Actinic Radiation-Curable Ink»

The actinic radiation-curable ink of the present invention comprises a coloring pigment. As the coloring pigment, a known material can be used, and examples thereof include inorganic pigments such as carbon black, yellow iron oxide, red iron oxide, a composite oxide (nickel-titanium type, chromium-titanium type, bismuth-vanadium type, cobalt-aluminum type, cobalt-aluminum-chromium type, and ultramarine blue), titanium oxide, etc. and organic pigments such as quinacridone type, diketopyrrolopyrrole type, benzimidazolone type, isoindolinone type, anthrapyrimidine type, phthalocyanine type, threne type, dioxazine type, azo type, etc. From a viewpoint of weather resistance, it is preferable to use an inorganic pigment.

In the above inks, the content of the coloring pigment is not particularly limited. The content is preferably 2 to 20% by mass from a viewpoint of chromogenic property of the ink.

It is preferable that the ink contains a dispersant. As the dispersant, an anionic dispersant, a cationic dispersant, and a nonionic surfactant dispersant are preferred. Note that a commercially available product can be suitably used as the dispersant.

«Polymerizable Compound»

The actinic radiation-curable ink of the present invention comprises a polymerizable compound such as an actinic radiation-polymerizable monomer. The actinic radiation-polymerizable monomer is a monomer which undergoes a polymerization reaction due to irradiation with actinic radiation such as ultraviolet radiation. For example, a monomer having a vinyl group, an acryloyloxy group or a methacryloyloxy group as a functional group which exhibits reactivity upon irradiation with actinic radiation is suitable. A cured product obtained after polymerization of the polymerizable compound such as an actinic radiation-polymerizable monomer functions as a binder.

The polymerizable compound of the present invention is characterized in that the glass transition temperature (sometimes abbreviated as Tg hereinafter) is −45 to 25° C. Even when a receiving layer into which a monomer contained in an actinic radiation-curable ink does not easily permeate is used, using a polymerizable compound having this Tg enables formation of an ink layer excellent in adhesiveness to the receiving layer. The Tg of the polymerizable compound in this context can be determined by the following Fox equation.

$$1/Tg = W1/Tg1 + W2/Tg2 + \ldots + Wn/Tgn$$

In the formula, Tg is calculated Tg (° K); W1, W2, ..., Wn are mass fractions of each monomer; and Tg1, Tg2, ..., Tgn are respectively glass transition temperatures (° K) of homopolymers of each monomer. As the actinic radiation-polymerizable monomer, a monofunctional monomer having one functional group, a bifunctional monomer having two functional groups, and a polyfunctional monomer having three or more functional groups can be used.

As the monofunctional monomer of the above actinic radiation-polymerizable monomers, those having a molecular weight of 1,000 or less are preferred, and examples thereof include stearyl acrylate, acryloylmorpholine, tridecyl acrylate, lauryl acrylate, N,N-dimethylacrylamide, decyl acrylate, 2-phenoxyethyl acrylate, isodecyl acrylate, isobornyl acrylate, dicyclopentanyl acrylate, dicyclopentenyl acrylate, isooctyl acrylate, octyl acrylate, dicyclopentenyloxyethyl acrylate, cyclohexyl acrylate, N-vinylcaprolactam, isoamyl acrylate, 2-ethylhexyl-diglycol acrylate, EO (ethylene oxide) modified 2-ethylhexyl acrylate, neopentyl glycol acrylate benzoate, N-vinyl-2-pyrrolidone, N-vinylimidazole, tetrahydrofurfuryl acrylate, methoxydipropylene glycol acrylate, (2-methyl-2-ethyl-1,3-dioxolan-4-yl) methyl acrylate, cyclic trimethylolpropane formal acrylate, ethoxy-diethylene glycol acrylate, 4-hydroxybutyl acrylate, etc. Note that these monofunctional monomers may be used alone, or two or more types may be used in combination.

As the bifunctional monomer of the above actinic radiation-polymerizable monomers, those having a molecular weight of 1,000 or less are preferred, and examples thereof include 1,10-decanediol diacrylate, 2-methyl-1,8-octanediol diacrylate, 2-butyl-2-ethyl-1,3-propanediol diacrylate, 1,9-nonanediol diacrylate, 1,8-octanediol diacrylate, 1,7-heptanediol diacrylate, polytetramethyleneglycol diacrylate, 3-methyl-1,5-pentanediol diacrylate, 1,6-hexanediol diacrylate, neopentyl glycol diacrylate, neopentyl glycol hydroxypivalate diacrylate, tripropylene glycol diacrylate, 1,4-butanediol diacrylate, dipropylene glycol diacrylate, etc. Note that these bifunctional monomers may be used alone, or two or more types may be used in combination.

As the trifunctional and more functional monomer among the above-mentioned actinic radiation-polymerizable monomers, those having a molecular weight of 2,000 or less are preferred, and examples thereof include trimethylolpropane triacrylate, ethoxylated trimethylolpropane triacrylate, propoxylated trimethylolpropane triacrylate, pentaerythritol triacrylate, ethoxylated glycerol triacrylate, tetramethylolmethane triacrylate, pentaerythritol tetraacrylate, ethoxylated pentaerythritol tetraacrylate, EO-modified diglycerin tetraacrylate, ditrimethylolpropane tetraacrylate, dipentaerythritol pentaacrylate, dipentaerythritol hexaacrylate, etc. Note that these polyfunctional monomers may be used alone, or two or more types may be used in combination.

In the above ink, the content of the actinic radiation-polymerizable monomer is preferably 1 to 95% by mass, and more preferably 70 to 95% by mass, from a viewpoint of reactivity. In addition, from a viewpoint of reducing residual monomers, the content of the monofunctional monomer is preferably 20 to 85% by mass, and more preferably 50 to 85% by mass.

The above ink may comprise acrylate oligomers. An acrylate oligomer is an oligomer having one or more acryloyloxy groups ($CH_2$=CHCOO—), and the number of functional groups is preferably two to six. In addition, it is preferable for the acrylate oligomer to have a molecular weight of 2,000 to 20,000. Note that the molecular weight is a weight average molecular weight in terms of polystyrene.

Examples of the acrylate oligomer include an aminoacrylate oligomer [an acrylate oligomer having a plurality of amino groups (—$NH_2$)], a urethane acrylate oligomer [an acrylate oligomer having a plurality of urethane bonds (—NHCOO—)], an epoxy acrylate oligomer [an oligomer having a plurality of epoxy acrylates obtained by reacting an epoxy compound with acrylic acid], a silicone acrylate oligomer [an acrylate oligomer having a plurality of siloxane bonds (—SiO—)], an ester acrylate oligomer [an acrylate oligomer having a plurality of ester bonds (—COO—)], a butadiene acrylate oligomer [an acrylate oligomer having a plurality of butadiene units], etc. In the above ink, the content of the acrylate oligomer is, for example, 0.4 to 20.0% by mass.

In the above ink, a photopolymerization initiator, a photo stabilizer, a polymerization inhibitor, etc. are preferably blended. Further, in addition to the above-described components, additives commonly used in the ink industry, for example, water, an organic solvent, an antioxidant, a silane coupling agent, a plasticizer, a rust inhibitor, a pH adjusting agent, a defoaming agent, a charge control agent, a stress relaxation agent, a penetration agent, a surface controlling agent, etc. may be appropriately selected and blended within a range not harming the object of the present invention.

In the above ink, a surface tension at temperatures during printing is preferably 20 to 35 mN/m, and a viscosity during printing is preferably 5 to 15 mPa·s. Note that the temperature of the ink during printing is preferably 35 to 50° C.

The above ink can be prepared by mixing the above coloring pigment, an actinic radiation-polymerizable monomer, and various components appropriately selected if necessary.

«Substrate»

The substrate is not particularly limited, and examples thereof include a wooden building material plate comprising wood as a raw material such as a veneer, a plywood, a particleboard, and a medium density fibrous board (MDF), etc.; ceramic building material plate such as a ceramic siding board, a flexible board, a calcium silicate plate, a gypsum slag perlite plate, a wood piece cement plate, an asbestos cement plate, a pulp cement plate, a precast concrete plate, a lightweight cellular concrete (ALC) plate, a gypsum board, etc.; and a metal building material plate such as aluminum, iron, stainless steel, etc. There is no particular limitation on the surface property of the substrate, and the surface may be smooth or may have an uneven shape. Further, the substrate may be subjected to a surface treatment using a sealer, a primer, or the like. The thickness of the substrate is not particularly limited, and is, for example, 3 to 30 mm.

«Method for Forming Ink-Receiving Layer»

The ink-receiving layer of the present invention can be formed by applying a coating material for ink-receiving layer according to the present invention on the above substrate, followed by drying and curing. The method of applying is not particularly limited, and examples thereof include air spray coating, airless spray coating, electrostatic coating, roll coater coating, flow coater coating, etc. The thickness of the ink-receiving layer is not particularly limited, and is, for example, 10 to 50 μm.

«Method for Forming Ink Layer»

The ink layer that constitutes the printed matter of the present invention can be formed by printing an actinic radiation-curable ink on the above-mentioned ink-receiving layer by, for example, a printing means such as printing by an inkjet printer (that is, an inkjet method) and then curing the ink. The thickness of the ink layer is not particularly limited, and is, for example, 10 to 50 μm.

Examples of the actinic radiation used for curing in the present invention include a metal halide lamp, a high pressure mercury lamp, or an ultraviolet radiation LED. The wavelength of the actinic radiation to be radiated preferably overlaps with the absorption wavelength of the photopolymerization initiator, and the principal wavelength of the actinic radiation is preferably in the range of 360 to 425 nm.

«Composition for Forming Surface Protecting Layer (Also Referred to as a Clear Layer)»

In the present invention, a clear layer disposed so as to cover the ink layer may be provided to protect the surface of the ink layer. This surface protecting layer can be formed, for example, by applying a clear coating composition for surface protection to an ink layer, optionally to an exposed substrate or a surface of an ink-receiving layer, and then forming a film by drying or the like. As the coating composition used for forming the surface protecting layer of the present invention, various clear coating materials, including solvent-based coating materials and water-borne coating materials, can be used.

The clear coating material in the present invention refers to a transparent coating material, and means a coating material which does not conceal a coating layer below by coloring, and various types of extender pigments or resin beads or the like can be appropriately added thereto to adjust finish appearance such as gloss and/or design, etc. as described below.

The clear coating composition of the present invention contains an organic solvent component whose SP value has an absolute difference of 0.70 of less with respect to a mass average SP value of polymerizable monomers contained in the actinic radiation-curable ink which forms the ink layer. By setting the absolute difference between the mass average SP value of the polymerizable monomers contained in the actinic radiation-curable ink and the SP value of the organic solvent component contained in the clear coating material to 0.70 or less, a printed matter which dissipates a small amount of monomer can be obtained.

This mechanism is considered as follows: reducing the difference between the SP value of the monomer components remaining in the ink layer and the SP value of the organic solvent component contained in the clear coating material allows the monomer component remaining in the ink layer to easily elute into the organic solvent component contained in the clear coating material; and this results in efficient azeotropy during the drying and curing step of the clear coating material, so that the monomer dissipation amount of the printed matter is reduced. The organic solvent component can be appropriately selected depending upon the actinic radiation-curable ink that constitutes the ink layer.

Note that the mass average value of the SP value is represented by the following formula.

$$\text{Mass-average value} = SP1 \times W1/\rho1 + SP2 \times W2/\rho2 + \ldots + SPn \times Wn/\rho n$$

In the formula, $SP1, SP2, \ldots, SPn$ are SP values of the respective monomers; $W1, W2, \ldots, Wn$ are mass fractions of the respective monomers in the polymerizable compound; and $\rho1, \rho2, \ldots, \rho n$ are densities of the respective monomers.

As the resin contained in the clear coating composition of the present invention, various synthetic resins such as an acrylic resin, an alkyd resin, a polyester resin, a polyurethane resin, an epoxy resin, a silicone resin and a fluororesin can be used, but the resin is not particularly limited. Of these resins, two or more types of resins may be used in combination.

As the clear coating composition of the present invention, surface protection is mainly intended, but additives and the like for imparting various functionalities as shown below can be used in addition. For the purpose of improving weather resistance, a photo stabilizer such as an ultraviolet absorber, etc. can be used in the clear coating composition, and two or more types of these photo stabilizers can be used in combination.

In order to adjust the finished appearance such as gloss and design, various types of extender pigments or resin beads and the like can be added, and two or more types can be combined. In order to improve adhesiveness to a layer below, i.e., the ink layer and/or ink-receiving layer and/or substrate, a silane coupling agent or the like may be added. In addition, a thickener, a dispersant, a defoaming agent, an anti-sedimentation agent, an antifungal agent or a preservative, etc., which are commonly used in the field of coating materials may be added as appropriate.

As a method of applying the clear coating composition of the present invention, a conventionally known coating method can be used without any particular limitation, and specifically, examples thereof include air spray coating, airless spray coating, electrostatic coating, roll coater coating, flow coater coating, etc.

Examples of the method of drying and curing the clear coating composition of the present invention include normal temperature drying, forced drying by hot air or infrared irradiation, and actinic irradiation, depending on the type of clear coating composition. In order to efficiently reduce the residual monomer component in the ink layer, drying and curing with heat energy is more suitable.

EXAMPLES

Hereinafter, the present invention will be described in more detail with reference to the Examples, but the present invention is not limited to the following Examples. In the Examples, "part(s)" and "%" shall mean part(s) by mass and mass percentage, respectively, unless otherwise specified.

Experimental Example 1

Effects of the ink-receiving layer were tested as follows.

Synthesis Example 1

A five-necked flask equipped with a stirrer, a reflux condenser, a thermometer, a dropping device, and a nitrogen introducing pipe was charged with 386 parts of ion-exchanged water and 10 parts of polyoxyethylen-1-(allyloxymethyl)alkyl ether sulfate ester ammonium salt (Aqualon KH10 manufactured by DKS). The temperature was raised to 80° C., with the atmosphere inside the reactor being replaced with nitrogen. Thereafter, 4 parts of ammonium persulfate were added to the reactor, and then 579 parts of methyl methacrylate, 348 parts of 2-ethylhexyl acrylate, 39 parts of methacrylic acid, and 579 parts of ion-exchanged water, which had been stirred and mixed in a separate container in advance, were continuously added dropwise over a period of 3.5 hours. Thereafter, the mixture was aged at 80° C. for 5 hours while continuing stirring, and then cooled to room temperature. Thereafter, the mixture was neutralized to pH 9 using a 28% by mass aqueous ammonia solution to obtain resin particle aqueous dispersion 1.

Synthesis Examples 2 to 16

As in Synthesis Example 1, syntheses were performed with monomer compositions of Table 1 to obtain resin particle aqueous dispersions 2 to 16. Note that, in the present invention, calculated Tg is a theoretically calculated value obtained by the following Fox equation.

$$1/Tg = W1/Tg1 + W2/Tg2 + \ldots + Wn/Tgn$$

In the formula, Tg is calculated Tg (° K), W1, W2, ..., Wn are mass fractions of the respective monomers; and Tg1, Tg2, ..., Tgn are respective glass transition temperatures (° K) of homopolymers of the respective monomers.

TABLE 1

| | | | Synthesis Example | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 |
| | | SP | Aqueous dispersion of resin particles | | | | | | | | | | | | | | | |
| Synthesis Example | | value | 1 | 2 | 3 | 4 | 5 | 6 | 7 | 8 | 9 | 10 | 11 | 12 | 13 | 14 | 15 | 16 |
| Cyclic structure containing monomer | CHMA | 9.48 | 0 | 97 | 0 | 0 | 0 | 0 | 49 | 97 | 0 | 0 | 0 | | 0 | 482 | 193 | 290 |
| | ST | 9.43 | 0 | 0 | 97 | 49 | 193 | 97 | 0 | 49 | 49 | 83 | 78 | 78 | 482 | 0 | 145 | 0 |
| | GMA | 10.86 | 0 | 0 | 0 | 10 | 10 | 0 | 34 | 0 | 34 | 0 | 0 | 0 | 0 | 0 | 0 | 0 |
| | KBM403 #1 | 9.29 | 0 | 0 | 0 | 29 | 29 | 29 | 0 | 29 | 29 | 29 | 29 | 29 | 0 | 0 | 0 | 0 |
| | LA82 | 8.26 | 0 | 0 | 0 | 0 | 0 | 10 | 0 | 0 | 0 | 0 | 0 | 0 | 0 | 0 | 0 | 10 |
| Other monomers | MMA | 9.53 | 579 | 531 | 502 | 463 | 309 | 473 | 503 | 405 | 373 | 307 | 210 | 175 | 0 | 406 | 0 | 396 |
| | EA | 9.98 | 0 | 0 | 0 | 0 | 0 | 0 | 0 | 0 | 0 | 0 | 0 | 0 | 58 | 0 | 0 | 0 |
| | BA | 9.67 | 0 | | 0 | 0 | 290 | | 0 | 290 | 0 | 0 | 0 | 0 | 0 | 0 | 492 | 0 |
| | EHA | 9.20 | 348 | 299 | 319 | 328 | 0 | 280 | 290 | 0 | 390 | 440 | 502 | 536 | 193 | 0 | 0 | 193 |
| | BMA | 9.27 | 0 | 0 | 0 | 0 | 0 | 0 | 0 | 0 | 0 | 0 | 0 | 0 | 213 | 0 | 97 | 0 |
| | MAA | 9.15 | 39 | 39 | 39 | 39 | 39 | 39 | 39 | 39 | 39 | 39 | 39 | 39 | 20 | 39 | 29 | 39 |
| | DAAM | 11.08 | 0 | 0 | 0 | 49 | 97 | 49 | 49 | 49 | 49 | 65 | 100 | 100 | 0 | 0 | 0 | 39 |
| | KBM503 #1 | 9.48 | 0 | 0 | 10 | 0 | 0 | 0 | 5 | 10 | 5 | 5 | 10 | 10 | 0 | 0 | 0 | 0 |
| | AMA | 9.43 | 0 | 0 | 0 | 0 | 0 | 0 | 0 | 0 | 0 | 0 | 0 | 0 | 0 | 39 | 10 | 0 |
| Total parts by mass | | | 966 | 966 | 967 | 967 | 967 | 977 | 968 | 968 | 968 | 968 | 968 | 967 | 966 | 966 | 966 | 967 |
| Content of structural unit derived from cyclic structure containing monomer in the resin (% by mass) | | | 0 | 10 | 10 | 9 | 24 | 14 | 9 | 18 | 12 | 12 | 11 | 11 | 50 | 50 | 35 | 31 |
| Content of structural unit derived from monomer with SP value 9.5 to 13.0 | | | 60 | 55 | 52 | 54 | 73 | 53 | 60 | 77 | 47 | 38 | 32 | 28 | 6 | 42 | 51 | 45 |
| Presence/absence of intermolecular crosslinking in the resin | | | Absent | Absent | Present | Present | Present | Present | Present | Present | Present | Present | Present | Present | Absent | Present | Present | Absent |
| Calculated Tg (° C.) | | | 30 | 36 | 34 | 30 | 32 | 39 | 35 | 31 | 20 | 10 | 0 | −5 | 32 | 85 | −5 | 48 |

For silane coupling agents, only SP values of organic groups are shown.

CHMA: cyclohexyl methacrylate
ST: styrene
GMA: glycidyl methacrylate
KBM403: 3-glycidoxypropyltrimethoxysilane (manufactured by Shin-Etsu Chemical)
LA82: 1,2,2,6,6-pentamethyl-4-piperidyl methacrylate (manufactured by ADEKA)
MMA: methyl methacrylate
EA: ethyl acrylate
BA: butyl acrylate
EHA: 2-ethylhexyl acrylate
BMA: butyl methacrylate
MAA: methacrylic acid
DAAM: diacetone acrylamide
KBM503: 3-methacryloyloxypropyltrimethoxysilane (manufactured by Shin-Etsu Chemical)
AMA: allyl methacrylate Preparation Examples of Coating Materials for Ink-Receiving Layers Examples 1 to 24 and Comparative Examples 1 to 8

According to the formulations shown in Tables 2 and 3, raw materials and titania beads were mixed and then dispersed by bead mill. After dispersing, the titania beads were removed to prepare the coating materials for ink-receiving layers.

TABLE 2

| | | Coating material for receiving layer | | | | | | | | | | | | | | | |
|---|---|---|---|---|---|---|---|---|---|---|---|---|---|---|---|---|
| | | Example | | | | | | | | | | | | Comparative Example | | | |
| | | 1 | 2 | 3 | 4 | 5 | 6 | 7 | 8 | 9 | 10 | 11 | 12 | 13 | 14 | 15 | 16 |
| Coloring pigment | White pigment [1] | 17 | 17 | 17 | 17 | 17 | 17 | 17 | 17 | 17 | 17 | 17 | 17 | 17 | 17 | 17 | 17 |
| Extender pigment | Extender pigment [2] | 11 | 11 | 11 | 11 | 11 | 11 | 11 | 11 | 11 | 11 | 11 | 11 | 11 | 11 | 11 | 11 |
| Resin composition | Synthesis Example 1 | 32.2 | | | | | | | | | | | | | | | |
| | Synthesis Example 2 | | 32.2 | | | | | | | | | | | | | | |
| | Synthesis Example 3 | | | 32.2 | | | | | | | | | | | | | |
| | Synthesis Example 4 | | | | 32.2 | | | | | | | | | | | | |
| | Synthesis Example 5 | | | | | 32.2 | | | | | | | | | | | |
| | Synthesis Example 6 | | | | | | 32.2 | | | | | | | | | | |
| | Synthesis Example 7 | | | | | | | 32.2 | | | | | | | | | |
| | Synthesis Example 8 | | | | | | | | 32.2 | | | | | | | | |
| | Synthesis Example 9 | | | | | | | | | 32.2 | | | | | | | |
| | Synthesis Example 10 | | | | | | | | | | 32.2 | | | | | | |
| | Synthesis Example 11 | | | | | | | | | | | 32.2 | | | | | |
| | Synthesis Example 12 | | | | | | | | | | | | 32.2 | | | | |
| | Synthesis Example 13 | | | | | | | | | | | | | 32.2 | | | |
| | Synthesis Example 14 | | | | | | | | | | | | | | 32.2 | | |
| | Synthesis Example 15 | | | | | | | | | | | | | | | 32.2 | |
| | Synthesis Example 16 | | | | | | | | | | | | | | | | 32.2 |
| Water | | 30 | 30 | 30 | 30 | 30 | 30 | 30 | 30 | 30 | 30 | 30 | 30 | 30 | 30 | 30 | 30 |
| Film forming aid | Ethylene glycol monobutyl ether | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 |
| Crosslinking agent | Adipic acid dihydrazide | | | | 0.3 | 0.6 | 0.3 | 0.3 | 0.3 | 0.3 | 0.3 | 0.3 | 0.3 | | | | 0.2 |
| Additive | Defoaming agent [3] | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| | Viscosity modifier [4] | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 |
| | Preservative [5] | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| | Ultraviolet absorber [6] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Photo stabilizer [7] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Total | Parts by mass | 100 | 100 | 100 | 100 | 100 | 100 | 100 | 100 | 100 | 100 | 100 | 100 | 100 | 100 | 100 | 100 |
| Presence/absence of interparticle crosslinking | | Absent | Absent | Absent | Present | Present | Present | Present | Present | Present | Present | Present | Present | Absent | Absent | Absent | Present |

TABLE 3

| | | Coating material for receiving layer | | | | | | | | | | | | | | | |
|---|---|---|---|---|---|---|---|---|---|---|---|---|---|---|---|---|
| | | Example | | | | | | | | | | | | Comparative Example | | | |
| | | 17 | 18 | 19 | 20 | 21 | 22 | 23 | 24 | 25 | 26 | 27 | 28 | 29 | 30 | 31 | 32 |
| Coloring pigment | White pigment [1] | 18 | 18 | 18 | 18 | 18 | 18 | 18 | 18 | 18 | 18 | 18 | 18 | 18 | 18 | 18 | 18 |
| Extender pigment | Extender pigment [2] | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 |
| Resin composition | Synthesis Example 1 | 34.7 | | | | | | | | | | | | | | | |
| | Synthesis Example 2 | | 34.7 | | | | | | | | | | | | | | |
| | Synthesis Example 3 | | | 34.7 | | | | | | | | | | | | | |
| | Synthesis Example 4 | | | | 34.7 | | | | | | | | | | | | |
| | Synthesis Example 5 | | | | | 34.7 | | | | | | | | | | | |
| | Synthesis Example 6 | | | | | | 34.7 | | | | | | | | | | |
| | Synthesis Example 7 | | | | | | | 34.7 | | | | | | | | | |
| | Synthesis Example 8 | | | | | | | | 34.7 | | | | | | | | |
| | Synthesis Example 9 | | | | | | | | | 34.7 | | | | | | | |

TABLE 3-continued

| | | Coating material for receiving layer | | | | | | | | | | | | | | |
|---|---|---|---|---|---|---|---|---|---|---|---|---|---|---|---|---|
| | | Example | | | | | | | | | | | | Comparative Example | | | |
| | | 17 | 18 | 19 | 20 | 21 | 22 | 23 | 24 | 25 | 26 | 27 | 28 | 29 | 30 | 31 | 32 |
| | Synthesis Example 10 | | | | | | | | | | 34.7 | | | | | | |
| | Synthesis Example 11 | | | | | | | | | | | 34.7 | | | | | |
| | Synthesis Example 12 | | | | | | | | | | | | 34.7 | | | | |
| | Synthesis Example 13 | | | | | | | | | | | | | 34.7 | | | |
| | Synthesis Example 14 | | | | | | | | | | | | | | 34.7 | | |
| | Synthesis Example 15 | | | | | | | | | | | | | | | 34.7 | |
| | Synthesis Example 16 | | | | | | | | | | | | | | | | 34.7 |
| Water | | 32.5 | 32.5 | 32.5 | 32.5 | 32.5 | 32.5 | 32.5 | 32.5 | 32.5 | 32.5 | 32.5 | 32.5 | 32.5 | 32.5 | 32.5 | 32.5 |
| Film forming aid | Ethylene glycol monobutyl ether | 5 | 5 | 5 | 5 | 5 | 5 | 5 | 5 | 5 | 5 | 5 | 5 | 5 | 5 | 5 | 5 |
| Cross-linking agent | Adipic acid dihydrazide | | | | 0.3 | 0.6 | 0.3 | 0.3 | 0.3 | 0.3 | 0.3 | 0.3 | 0.3 | | | | 0.2 |
| Additive | Defoaming agent [3] | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| | Viscosity modifier [4] | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| | Preservative [5] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Ultraviolet absorber [6] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Photo stabilizer [7] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Total Parts by mass | | 100 | 100 | 100 | 100 | 100 | 100 | 100 | 100 | 101 | 102 | 103 | 104 | 100 | 100 | 100 | 100 |
| Presence/absence of interparticle crosslinking | | Absent | Absent | Absent | Present | Present | Present | Present | Present | Present | Present | Present | Present | Absent | Absent | Absent | Present |

1) Titanium oxide having a density of 3.8 g/cm$^3$ (TITONE R-62N manufactured by Sakai Chemical Industry)
2) Heavy calcium carbonate, having a density of 2.7 g/cm$^3$ and a mean particle size of 2 μm (manufactured by Maruo Calcium)
3) SN defoamer 1316 (manufactured by San Nopco)
4) ASE-60 (manufactured by Rohm and Haas)
5) Proxel AM (manufactured by Arch Chemicals)
6) TINUVIN 1130 (manufactured by BASF)
7) Sanol LS-292 (manufactured by Sankyo Chemical)

Preparation Examples of Actinic Radiation-Curable Inks

According to the formulation recipes shown in Table 4, raw materials and zirconia beads (φ: 0.5 mm) were mixed and then dispersed by bead mill. After dispersing, the zirconia beads were removed to prepare black UV ink (hereinafter, also referred to as UV ink).

TABLE 4

| | | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|---|
| Coloring pigment | Black pigment [8] | 4.00 | 4.00 | 4.00 | 4.00 | 4.00 | 4.00 | 4.00 | 4.00 | 4.00 | 4.00 |
| Polymerizable monomer | Light Acrylate PO-A [9] | 63.00 | 25.00 | 27.00 | 25.00 | 9.50 | 25.00 | 30.00 | 40.00 | 15.00 | 13.00 |
| | Light Acrylate P2H-A [10] | | 28.00 | 20.00 | 10.00 | | | | | | |
| | Light Acrylate IB-XA [11] | | | | | | | | 40.00 | 20.00. | 45.00 |
| | Light Acrylate EC-A [12] | 16.00 | 10.00 | 10.00 | 7.50 | 15.00 | | | | | |
| | Light Acrylate DPM-A [13] | | 6.50 | 7.00 | | 8.50 | 20.00 | | | | |
| | CTFA [14] | | | | | 37.00 | | | | | |
| | 4-HBA [15] | | | | 5.00 | 10.00 | 5.00 | | 10.00 | | 1.50 |
| | Light Acrylate THF-A [16] | | | | | | | | | 4.00 | 4.00 |
| | FA2D [17] | | | | | | | | | 0.50 | 5.00 |
| | DAAM [18] | | | | | | 2.00 | | | | |
| | HEA [19] | | | | | | | | | 0.50 | 0.50 |
| | IDAA [20] | | 8.00 | 8.00 | 5.00 | | | | | | |
| | Light Acrylate 1.6HX-A [21] | | | | | | | 30.00 | | 20.00 | |
| | Light Acrylate 1.9ND-A [22] | | | | | 26.00 | | 35.00 | | | |
| | Light Acrylate DCP-A [23] | | | | | | | | | 9.00 | |
| | Light Acrylate TMP-A [24] | 5.00 | 5.00 | 5.00 | | 5.00 | 0.50 | | 10.00 | 1.50 | |
| Photo polymerization initiator | IRGACURE TRO [25] | 6.00 | 6.00 | 6.00 | 6.00 | 6.00 | 6.00 | 6.00 | 6.00 | 6.00 | 6.00 |
| | Irgacure 184 [26] | 3.00 | 3.00 | 3.00 | 3.00 | 3.00 | 3.00 | 3.00 | 3.00 | 3.00 | 3.00 |
| | KAYACURE DETX-S [27] | 2.00 | 2.00 | 2.00 | 2.00 | 2.00 | 2.00 | 2.00 | 2.00 | 2.00 | 2.00 |
| Additive | Dispersant [28] | 0.50 | 0.50 | 0.50 | 0.50 | 0.50 | 0.50 | 0.50 | 0.50 | 0.50 | 0.50 |
| | Surface controlling agent [29] | 0.50 | 0.50 | 0.50 | 0.50 | 0.50 | 0.50 | 0.50 | 0.50 | 0.50 | 0.50 |
| Total (parts by mass) | | 100.0 | 98.5 | 98.0 | 99.5 | 98.0 | 96.5 | 86.0 | 106.0 | 86.50 | 85.00 |
| SP value of polymerizable compound | | 10.3 | 10.1 | 10.1 | 10.1 | 10.1 | 9.9 | 10.2 | 9.7 | 9.7 | 9.4 |
| Polymerizable monofunctionale monomer/polymerizable compound (%) | | 94.0 | 93.9 | 93.9 | 68.9 | 93.9 | 55.9 | 57.1 | 88.9 | 56.7 | 100.0 |
| Tg of polymerizable compound (calculated following Fox equation) | | −29.3 | −34.6 | −34.1 | −12.1 | −9.7 | 8.4 | 6.7 | 28.8 | 64.0 | 52.8 |

8) Black pigment MA100 (trade name of carbon black pigment manufactured by Mitsubishi Chemical)
9) Light Acrylate PO-A (trade name of phenoxyethyl acrylate manufactured by Kyoeisha Chemical) having a specific gravity of 1.2, the number of functional groups of 1, Tg of −22° C. and an SP value of 10.4
10) Light Acrylate P2H-A (trade name of phenoxydiethylene glycol acrylate manufactured by Kyoeisha Chemical) having a specific gravity of 1.2, the number of functional groups of 1, Tg of −35° C. and an SP value of 10.2
11) Light Acrylate IB-XA (trade name of isobornyl acrylate manufactured by Kyoeisha Chemical) having a specific gravity of 1.2, the number of functional groups of 1, Tg of 94° C. and an SP value of 8.87
12) Light Acrylate EC-A (trade name of ethoxy-diethylene glycol acrylate manufactured by Kyoeisha Chemical) having a specific gravity of 1.2, the number of functional groups of 1, Tg of −70° C., and an SP value of 9.96
13) Light Acrylate DPM-A (trade name of methoxydipropylene glycol acrylate manufactured by Kyoeisha Chemical) having a specific gravity of 1.2, the number of functional groups of 1, Tg of −30° C., and an SP value of 9.69
14) CTFA (trade name of cyclic trimethylolpropane formal acrylate manufactured by Osaka Organic Chemical Industry) having a specific gravity of 1.2, the number of functional groups of 1, Tg of 27° C. and an SP value of 9.95
15) 4-HBA (trade name of 4-hydroxybutyl acrylate manufactured by Osaka Organic Chemical Industry) having a specific gravity of 1.2, the number of functional groups of 1, Tg of −32° C. and SP value of 10.8
16) Light Acrylate THF-A (trade name of tetrahydrofurfuryl acrylate manufactured by Kyoeisha Chemical) having a specific gravity of 1.2, the number of functional groups of 1, Tg of −12° C. and SP value of 10.1
17) Placcel FA-2D (trade name of a lactone-modified acrylate manufactured by Daicel) having a specific gravity of 1.2, the number of functional groups of 1, Tg of −40° C. and an SP-value of 10.5
18) DAAM (trade name of diacetone acrylamide manufactured by Nippon Chemical) having a specific gravity of 1.2, the number of functional groups of 1, Tg of 77° C. and an SP value of 11.5
19) HEA (trade name of 2-hydroxyethyl acrylate manufactured by Osaka Organic Chemical Industry) having a specific gravity of 1.2, the number of functional groups of 1, Tg of −15° C. and an SP value of 11.4
20) IDAA (trade name of isodecyl acrylate manufactured by Osaka Organic Chemical Industry) having a specific gravity of 1.2, the number of functional groups of 1, Tg of −62° C., an SP value of 8.98
21) Light Acrylate 1,6 HX-A (trade name of 1,6-hexanediol diacrylate manufactured by Kyoeisha Chemical) having a specific gravity of 1.2, the number of functional groups of 2, Tg of 63° C. and an SP value of 9.82
22) Light Acrylate 1,9 ND-A (trade name of 1,9-nonanediol diacrylate manufactured by Kyoeisha Chemical) having a specific gravity of 1.2, the number of functional groups of 2, Tg of 68° C. and an SP value of 9.63
23) Light Acrylate DCP-A (trade name of dimethyloltricyclodecane diacrylate manufactured by Kyoeisha Chemical) having a specific gravity of 1.2, the number of functional groups of 2, Tg of 187° C. and an SP value of 9.72
24) Light Acrylate TMP-A (trade name of trimethylolpropane triacrylate manufactured by Kyoeisha Chemical) having a specific gravity of 1.2, the number of functional groups of 3, Tg of 62° C. and an SP value of 9.90
25) IRGACURE TPO (trade name of acylphosphine oxide-based photopolymerization initiator manufactured by BASF)
26) IRGACURE 184 (trade name of alkylphenone-based photopolymerization initiator manufactured by BASF)
27) KAYACURE DETX-S (trade name of 2,4-diethylthioxanthone manufactured by Nippon Kayaku)
28) DISPERBYK-2155 (trade name of a product manufactured by BYK)
29) BYK-UV3500 (trade name of a product manufactured by BYK)

Note that surface tension of an actinic radiation-curable ink was measured using a surface tension meter (CBVP-Z manufactured by Kyowa Interface Science) at a temperature of 45° C. Further, viscosity of an actinic radiation-curable ink was measured using a rheometer (Physica MCR301 manufactured by Anton Paar GmbH) at a temperature of 45° C. and a shear rate of 10 $s^{-1}$.

Preparation Examples of Coating Compositions for Clear Layers (Hereinafter Referred to as "Clear Coating Materials")

According to the formulation recipes shown in Tables 5 and 6, raw materials were mixed to prepare clear coating materials.

TABLE 5

| | | | Clear 1 | Clear 2 | Clear 3 | Clear 4 | Clear 5 |
|---|---|---|---|---|---|---|---|
| Resin (aqueous dispersion) | Polydurex G613 [31] | Tg 26° C. NV. 41% | 73 | 73 | 73 | 73 | 73 |
| | Lumiflon FE-4400 [32] | Tg 35° C. NV. 51% | | | | | |
| | Acryset EX41 [33] | Tg 20° C. NV. 43% | | | | | |
| | UW E-670 [34] | Tg 20° C. NV. 45% | | | | | |
| | JONCRYL 538 [35] | Tg 66° C. NV. 45% | | | | | |
| Water | Ion exchanged water | | 12 | 12 | 12 | 12 | 12 |
| Organic solvent | Ethylene glycol monobutyl ether (CCB) | SP VALUE 11.01 | 5 | | | | |
| | Diethylene glycol monobutyl ether (2CCB) | SP VALUE 10.38 | | 5 | | | |
| | Dipropylene glycol n-butyl ether | SP VALUE 10.00 | | | 5 | | |
| | Diethlene glycol monobutyl ether acetate (2CCBA) | SP VALUE 9.79 | | | | 5 | |
| | Texanol | SP VALUE 9.23 | | | | | 5 |

TABLE 5-continued

|  |  | Clear 1 | Clear 2 | Clear 3 | Clear 4 | Clear 5 |
|---|---|---|---|---|---|---|
| Additive | Defoaming agent | 0.5 | 0.5 | 0.5 | 0.5 | 0.5 |
|  | Viscosity modifier | 10 | 10 | 10 | 10 | 10 |
|  | Preservative | 0.05 | 0.05 | 0.05 | 0.05 | 0.05 |
| Total(Parts by mass) |  | 100.55 | 100.55 | 100.55 | 100.55 | 100.55 |
| Tg of coating film (° C.) |  | 26 | 26 | 26 | 26 | 26 |

TABLE 6

|  |  |  | Clear 6 | Clear 7 | Clear 8 | Clear 9 | Clear 10 |
|---|---|---|---|---|---|---|---|
| Resin (aqueous dispersion) | Polydurex G613 [31] | Tg 26° C. NV. 41% |  |  |  |  |  |
|  | Lumiflon FE-4400 [32] | Tg 35° C. NV. 51% | 15 | 15 |  |  |  |
|  | Acryset EX41 [33] | Tg 20° C. NV. 43% | 52 | 52 | 35 | 35 |  |
|  | UW E-670 [34] | Tg 20° C. NV. 45% |  |  | 33 | 33 |  |
|  | JONCRYL 538 [35] | Tg 66° C. NV. 45% |  |  |  |  | 67 |
| Water | Ion exchanged water |  | 18 | 18 | 17 | 17 | 18 |
| Organic solvent | Ethylene glycol monobutyl ether (CCB) | SP VALUE 11.01 |  |  |  |  |  |
|  | Diethylene glycol monobutyl ether (2CCB) | SP VALUE 10.38 | 5 |  | 5 |  | 5 |
|  | Dipropylene glycol n-butyl ether | SP VALUE 10.00 |  | 5 |  | 5 |  |
|  | Diethlene glycol monobutyl ether acetate (2CCBA) | SP VALUE 9.79 |  |  |  |  |  |
|  | Texanol | SP VALUE 9.23 |  |  |  |  |  |
| Additive | Defoaming agent |  | 0.5 | 0.5 | 0.5 | 0.5 | 0.5 |
|  | Viscosity modifier |  | 10 | 10 | 10 | 10 | 10 |
|  | Preservative |  | 0.05 | 0.05 | 0.05 | 0.05 | 0.05 |
| Total(Parts by mass) |  |  | 100.55 | 100.55 | 100.55 | 100.55 | 100.55 |
| Tg of coating film (° C.) |  |  | 23.8 | 23.8 | 20 | 20 | 66 |

30) Polydurex G613 (trade name of an acrylic silicone resin-based emulsion manufactured by Asahi Kasei).
31) Lumiflon FE-4400 (trade name of a fluororesin emulsion manufactured by AGC)
32) Acryset EX-41 (trade name of an acrylic resin emulsion manufactured by Nippon Shokubai)
33) UW E-670 (trade name of a HALS-containing acrylic resin emulsion manufactured by Nippon Shokubai)
34) JONCRYL 538 (trade name of an acrylic resin emulsion, manufactured by BASF)

Preparation Examples of Building Boards (Decoration Test Boards)

1. Substrate

A substrate was prepared by applying a water-borne sealer (manufactured by Dai Nippon Toryo, product name: water-borne Mighty Sealer Multi) to the surface of a slate plate (150 mm×70 mm×5 mm, manufactured by TP Giken) with an air spray so as to have a coating amount of 100 g/m², followed by drying at room temperature for 2 hours.

2. Ink-Receiving Layer

While maintaining the substrate coated with the sealer at 60° C., the above-described coating material for ink-receiving layer was applied to the sealer-coated surface of the substrate by airless spray so as to have a coating volume of 120 g/m² (corresponding to a dry film thickness of 30 μm). Thereafter, the coating material was dried at 100° C. for 3 minutes to form an ink-receiving layer. Measurement of substrate temperatures was performed using a non-contact infrared ray radiation thermometer (ISK-870011, manufactured by AS ONE).

3. Ink Layer

After preparation of the ink-receiving layer, with the substrate temperature being adjusted to 50 to 60° C., a gradation pattern (a solid image in which recording densities were increased in a stepwise manner of 20% from 10% to 100%) of the UV ink (black) prepared above was formed using an inkjet printer. At this time, the temperature of the ink at a time of ink ejection was 45° C. After formation of the pattern, the ink was cured by irradiation with ultraviolet radiation having an integrated light amount of 300 mJ/cm² with a peak illuminance of 800 mW/cm², using a metal halide lamp. Measurement of substrate temperatures was performed using a non-contact infrared radiation thermometer (ISK-870011, manufactured by AS ONE).

4. Clear Layer

After curing the ink, in a state in which the surface temperature of the cured coating film was adjusted to be 50° C., the above-described clear coating material 3 was applied so that the coating amount was 80 g/m² (corresponding to a dry film thickness of 25 μm). After the application, the clear coating material was dried at 80° C. for 20 minutes to form a clear layer. Note that, measurement of surface temperatures was performed using a non-contact infrared ray radiation thermometer (ISK-870011, manufactured by AS ONE).

[Evaluation Methods]

Ink absorption rates of the ink-receiving layers, printing evaluation (chromogenic property, dot-diameter), adhesiveness, water resistance and weather resistance as well as monomer dissipation rates of the printed matters after ink layer lamination or clear-layer lamination were evaluated by the following methods. Measurement results are shown in Table 7 to Table 12. Note that evaluations were made under an atmosphere of 23° C. and 50% RH, unless otherwise specified.

(1) Chromogenic Property

Gradation patterns 1 day after preparation of printed matters were evaluated for chromogenic property by observation with the naked eye and a microscope. Evaluation criteria are as follows.

A: Original color of the ink is printed uniformly without unevenness or bleeding.

C: There is unevenness, rubbing, and/or bleeding in the gradation pattern.

(2) Dot Diameters

For gradation patterns 1 day after preparation of printed matters, diameters of dots at five random positions were measured by a microscope, and an average was obtained.

(3) Adhesiveness (According to JIS K5600-5-6: 1999)

Incisions were made into each of the prepared printed matters using a cutter knife at 2 mm intervals in length and width to prepare 100 cells, and Cellotape (registered trademark) peeling test was performed. Evaluation criteria are as follows.

A: Classes 0 to 1
B: Class 2
C: Classes 3 to 5

Note that classes 0 to 5 described in Section 8.3 of JIS K 5600-5-6:1999 are as follows.

Class 0: Edges of the cut are perfectly smooth and no peeling is observed in any of the cells.

Class 1: A residual rate of the laminated coating film is 95 to 99%.

Class 2: A residual rate of the laminated coating film is 85% or more and less than 95%.

Class 3: A residual rate of the laminated coating film is 65% or more and less than 85%.

Class 4: A residual rate of the laminated coating film is 0% or more and less than 65%

Class 5: A peeling degree which cannot be classified even into Class 4.

(4) Water Resistance (According to JIS K 5600-6-2: 1999)

Each of the prepared printed matters was immersed in a constant temperature water bath kept at 40° C., and taken out after 240 hours to dry. Thereafter, the appearance of generated swelling, whitening, etc. were observed, and adhesiveness was evaluated in the same manner as in the method of (2) above. Evaluation criteria are as follows. However, Examples 31 and 32 and Comparative Examples 10 to 12 were not evaluated.

AA: There is no abnormal appearance such as swelling, whitening, etc. and adhesiveness is class 0.

A: There is no abnormal appearance such as swelling, whitening, etc., and adhesiveness is class 1.

B: There is no abnormal appearance such as swelling, whitening, etc. and adhesiveness is class 2 or 3.

C: Abnormal appearance such as swelling, whitening, etc. is observed. Adhesiveness is class 4 or 5.

(5) Accelerated Weather Resistance (According to JIS K 5600-7-7: 2008)

Each of the prepared printed matters was subjected to accelerated weatherability test according to a xenon lamp method described in JIS K 5600-7-7 using Weather-Ometer Ci4000 (manufactured by Atlas). The test was carried out up to test time of 1,000 hours, and the appearance of the coating film was visually evaluated. Adhesiveness was evaluated in the same manner as in the method of (2) above. Evaluation criteria are as follows. However, Examples 31 and 32 and Comparative Examples 10 to 12 were not evaluated.

A: There is no abnormal appearance such as swelling, chalking, cracking, etc. and adhesiveness is class 0 or 1.

B: There is no abnormal appearance such as swelling, chalking, cracking, etc. and adhesiveness is class 2 or 3.

C: Abnormal appearance such as swelling, chalking, cracking etc. are observed. Adhesiveness is class 4 or 5.

(6) Method for Measuring Ink Absorption Rates

Each of the coating materials for ink-receiving layer was applied on a rigid PVC plate warmed to 60° C. in advance, using a 20 mil applicator and dried at 100° C. for 3 minutes (downwind). The dried film was peeled off and cut into a piece 50 mm long and 50 mm wide to measure the mass. 100 g of UV ink (black) was placed in a 200 ml glass container, and further, the above-mentioned dried and cut film was placed. After immersion at 50° C. for 24 hours, the film was taken out and placed on a sheet of Kimtowel (Crecia). Further, another sheet of Kimtowel was placed on the above-mentioned film placed on the sheet of Kimtowel to sandwich the film. The UV ink on the film surface was removed at a weight of 500 g, and the mass of the dried film was measured. From the mass change before and after the immersion of the dried film, ink absorption rate was calculated by the following calculation formula.

{(Mass after immersion−mass before immersion)/ mass before immersion}×100=ink absorption rate (%)　　　Formula for calculation (7) Elongation Rates of Coating Films Each of the coating materials for ink-receiving layer was applied on a polypropylene plate using a 20 mil applicator and dried at 23° C. for 24 hours. Thereafter, the coating material for ink-receiving layer was dried at 80° C. for 3 hours, and then at 120° C. for 30 minutes. Then, the obtained dried film was peeled off, and cut into a piece 70 mm long and 5 mm wide to obtain a test piece. The test piece was subjected to a tensile test using an autograft AG-100KN Type I manufactured by Shimadzu at 23° C. and 50% RH at a speed of 5 mm/min., and the elongation rate of the coating film was calculated by the following calculation formula. Here, the test piece length in the tensile test was adjusted to 50 mm.

{(Length of test piece at break in tensile test−length of test piece before the test)/(length of test piece before test)}×100=elongation rate (%) of coating film (8) Monomer Dissipation Rate of Ink Layer A monomer dissipation amount was calculated by gas chromatography measurement using a small chamber according to JIS A 1901: 2015.

1. An inside of a 20 L chamber was set at a temperature of 28° C., a humidity of 50% RH, and a ventilation frequency of 0.5 times/hr, and stabilized for 1 hour.

2. Air in the chamber was collected to determine a detection amount of monomers (background) before setting the test piece.

3. A test piece was set in the chamber and allowed to dissipate monomers for 2 hours. Measurement was made at 1 hour after the test piece preparation when the test piece temperature was lowered to 28° C.

4. Air in the chamber was collected, to determine a detection amount of monomers after the test piece was placed.

5. A monomer concentration was calculated using a calibration curve prepared from a standard reagent, and the dissipation rate of each monomer was calculated from the following formula.

$EFa = Ct \times n/L$　　　(Formula)

EFa: monomer dissipation rate per unit area ($\mu g/m^2 \cdot hr$)

n: Ventilation frequency (times/hr)

Ct: concentration of monomers in the chamber at elapsed time t

L: Sample load ratio ($m^2/m^3$) (ratio of a volume of the small chamber with respect to a surface area of the test piece)

<Evaluation Results>

TABLE 7

|  | Example 1 | Example 2 | Example 2 | Example 4 | Example 5 | Example 6 | Example 7 |
|---|---|---|---|---|---|---|---|
| Receiving layer | Coating material for receiving layer 1 | Coating material for receiving layer 2 | Coating material for receiving layer 3 | Coating material for receiving layer 4 | Coating material for receiving layer 5 | Coating material for receiving layer 6 | Coating material for receiving layer 7 |
| Ink layer | Ink 4 | Ink 4 | Ink 4 | Ink 4 | Ink 4 | Ink 4 | Ink 4 |
| Surface protecting layer | Clear 3 | Clear 3 | Clear 3 | Clear 3 | Clear 3 | Clear 3 | Clear 3 |
| Ink absorption rate | 64 | 76 | 60 | 56 | 44 | 44 | 58 |
| Printing evaluation Chromogenic property | A | A | A | A | A | A | A |
| Dot diameter | 90 | 110 | 119 | 148 | 141 | 130 | 107 |
| Adhesiveness | A | A | A | A | A | A | A |
| Water resistance | A | A | A | A | A | A | A |
| Weather resistance | A | A | A | A | A | A | A |
| Elongation of receiving layer (%) | 24 | 20 | 23 | 19 | 20 | 18 | 15 |
| Monomer dissipation rate of printed matter | 0.6 | 0.8 | 0.5 | 0.2 | 0.1 | 0.1 | 0.3 |

|  | Example 8 | Example 9 | Example 10 | Example 11 | Example 12 |
|---|---|---|---|---|---|
| Receiving layer | Coating material for receiving layer 8 | Coating material for receiving layer 9 | Coating material for receiving layer 10 | Coating material for receiving layer 11 | Coating material for receiving layer 12 |
| Ink layer | Ink 4 | Ink 4 | Ink 4 | Ink 4 | Ink 4 |
| Surface protecting layer | Clear 3 | Clear 3 | Clear 3 | Clear 3 | Clear 3 |
| Ink absorption rate | 45 | 60 | 57 | 55 | 56 |
| Printing evaluation Chromogenic property | A | A | A | A | A |
| Dot diameter | 130 | 127 | 130 | 142 | 151 |
| Adhesiveness | A | A | A | A | A |
| Water resistance | A | A | A | A | A |
| Weather resistance | A | A | A | A | A |
| Elongation of receiving layer (%) | 16 | 17 | 18 | 16 | 13 |
| Monomer dissipation rate of printed matter | 0.1 | 0.5 | 0.2 | 0.2 | 0.2 |

TABLE 8

|  | Example 13 | Example 14 | Example 15 | Example 16 | Example 17 | Example 18 | Example 19 |
|---|---|---|---|---|---|---|---|
| Receiving layer | Coating material for receiving layer 17 | Coating material for receiving layer 18 | Coating material for receiving layer 19 | Coating material for receiving layer 20 | Coating material for receiving layer 21 | Coating material for receiving layer 22 | Coating material for receiving layer 23 |
| Ink layer | Ink 4 | Ink 4 | Ink 4 | Ink 4 | Ink 4 | Ink 4 | Ink 4 |
| Surface protecting layer | Clear 3 | Clear 3 | Clear 3 | Clear 3 | Clear 3 | Clear 3 | Clear 3 |
| Ink absorption rate | 70 | 83 | 67 | 60 | 50 | 50 | 65 |
| Printing evaluation Chromogenic property | A | A | A | A | A | A | A |
| Dot diameter | 94 | 113 | 122 | 150 | 142 | 135 | 110 |
| Adhesiveness | A | A | A | A | A | A | A |
| Water resistance | A | A | AA | AA | AA | AA | AA |
| Weather resistance | A | A | A | A | A | A | A |
| Elongation of receiving layer (%) | 26 | 22 | 23 | 20 | 14 | 17 | 15 |
| Monomer dissipation rate of printed matter | 0.6 | 0.8 | 0.6 | 0.5 | 0.2 | 0.2 | 0.6 |

|  | Example 20 | Example 21 | Example 22 | Example 23 | Example 24 |
|---|---|---|---|---|---|
| Receiving layer | Coating material for receiving layer 24 | Coating material for receiving layer 25 | Coating material for receiving layer 26 | Coating material for receiving layer 27 | Coating material for receiving layer 28 |
| Ink layer | Ink 4 | Ink 4 | Ink 4 | Ink 4 | Ink 4 |
| Surface protecting layer | Clear 3 | Clear 3 | Clear 3 | Clear 3 | Clear 3 |

TABLE 8-continued

|  |  |  |  |  |  |  |
|---|---|---|---|---|---|---|
|  | Ink absorption rate | 50 | 68 | 55 | 56 | 48 |
| Printing evaluation | Chromogenic property | A | A | A | A | A |
|  | Dot diameter | 131 | 142 | 133 | 154 | 158 |
| Adhesiveness |  | A | A | A | A | A |
| Water resistance |  | AA | AA | AA | AA | AA |
| Weather resistance |  | A | A | A | AA | AA |
| Elongation of receiving layer (%) |  | 16 | 18 | 15 | 12 | 15 |
| Monomer dissipation rate of printed matter |  | 0.2 | 0.6 | 0.2 | 0.2 | 0.1 |

TABLE 9

|  | Comparative Example 1 | Comparative Example 2 | Comparative Example 3 | Comparative Example 4 |
|---|---|---|---|---|
| Receiving layer | Coating material for receiving layer 13 | Coating material for receiving layer 14 | Coating material for receiving layer 15 | Coating material for receiving layer 16 |
| Ink layer | Ink 4 | Ink 4 | Ink 4 | Ink 4 |
| Surface protecting layer | Clear 3 | Clear 3 | Clear 3 | Clear 3 |
| Ink absorption rate | # Dissolution | 200 | 180 | 170 |
| Printing evaluation Chromogenic property | C | C | C | C |
| Dot diameter | 70 | 62 | 75 | 78 |
| Adhesiveness | B | B | B | B |
| Water resistance | C | B | C | C |
| Weather resistance | B | A | B | A |
| Elongation of receiving layer (%) | 43 | 38 | 34 | 55 |
| Monomer dissipation rate of printed matter | 5.0 | 3.0 | 2.8 | 2.5 |

TABLE 10

|  | Comparative Example 5 | Comparative Example 6 | Comparative Example 7 | Comparative Example 8 |
|---|---|---|---|---|
| Receiving layer | Coating material for receiving layer 29 | Coating material for receiving layer 30 | Coating material for receiving layer 31 | Coating material for receiving layer 32 |
| Ink layer | Ink 4 | Ink 4 | Ink 4 | Ink 4 |
| Surface protecting layer | Clear 3 | Clear 3 | Clear 3 | Clear 3 |
| Ink absorption rate | # Dissolution | 210 | 200 | 195 |
| Printing evaluation Chromogenic property | C | C | C | C |
| Dot diameter | 72 | 65 | 76 | 81 |
| Adhesiveness | A | B | B | B |
| Water resistance | B | A | B | B |
| Weather resistance | A | A | A | A |
| Elongation of receiving layer (%) | 48 | 45 | 39 | 42 |
| Monomer dissipation rate of printed matter | 5.5 | 3.2 | 3.0 | 2.8 | indicates that a dried film obtained from the coating material for ink-receiving layer was completely dissolved in the UV-ink (black).

TABLE 11

|  | Example 25 | Example 26 | Example 27 | Example 28 | Example 29 | Example 30 | Comparative Example 9 |
|---|---|---|---|---|---|---|---|
| Receiving layer | Coating material for receiving layer 27 | Coating material for receiving layer 27 | Coating material for receiving layer 27 | Coating material for receiving layer 27 | Coating material for receiving layer 27 | Coating material for receiving layer 27 | Coating material for receiving layer 27 |

TABLE 11-continued

|  | Example 25 | Example 26 | Example 27 | Example 28 | Example 29 | Example 30 | Comparative Example 9 |
|---|---|---|---|---|---|---|---|
| Ink layer | Ink 1 | Ink 2 | Ink 3 | Ink 5 | Ink 6 | Ink 7 | Ink 8 |
| Surface protecting layer | Clear 3 | Clear 3 | Clear 3 | Clear 3 | Clear 3 | Clear 3 | Clear 3 |
| Ink absorption rate | 55 | 55 | 55 | 55 | 55 | 55 | 55 |
| Printing evaluation   Chromogenic property | A | A | A | A | A | A | A |
|         Dot diameter | 142 | 142 |  | 142 | 142 | 142 | 142 |
| Adhesiveness | A | A | A | A | A | A | B |
| Water resistance | AA | AA | AA | AA | AA | AA | B |
| Weather resistance | AA | AA | AA | AA | AA | AA | A |
| Elongation of receiving layer (%) | 12 | 12 | 12 | 12 | 12 | 12 | 12 |
| Monomer dissipation rate of printed matter | 0.2 | 0.2 | 0.2 | 0.9 | 0.1 | 0.2 | 0.1 |

TABLE 12

|  | Example 31 | Example 32 | Comparative Example 10 | Comparative Example 11 | Comparative Example 12 |
|---|---|---|---|---|---|
| Receiving layer | Coating material for receiving layer 2 | Coating material for receiving layer 3 | Coating material for receiving layer 14 | Coating material for receiving layer 15 | Coating material for receiving layer 16 |
| Ink layer | Ink 4 | Ink 4 | Ink 4 | Ink 4 | Ink 4 |
| Surface protecting layer | None | None | None | None | None |
| Ink absorption rate | 76 | 60 | 200 | 180 | 170 |
| Printing evaluation   Chromogenic property | A | A | C | C | C |
|         Dot diameter | 110 | 119 | 62 | 75 | 78 |
| Adhesiveness | A | A | B | B | B |
| Elongation of receiving layer (%) | 20 | 23 | 38 | 34 | 55 |
| Monomer dissipation rate of ink-receiving layer | 4.8 | 3.8 | 10 | 8.5 | 7.5 |

As described above, the present invention is excellent in the ink absorption rate of ink-receiving layer, printing evaluation (chromogenic property, dot diameter), and adhesiveness, and further, the monomer dissipation amount of ink layer is small.

Experimental Example 2

Effects of the surface protecting layer were tested as follows.

Preparation Examples of Building Boards (Decoration Test Boards)

1. Substrate

A substrate was prepared by applying a water-borne sealer (manufactured by Dai Nippon Toryo, product name: water-borne Mighty Sealer Multi) to the surface of a slate plate (150 mm×70 mm×5 mm, manufactured by TP Giken) with an air spray so as to have a coating amount of 100 g/m$^2$, followed by drying at room temperature for 2 hours.

2. Ink-Receiving Layer

While maintaining the substrate coated with the sealer at 60° C., a coating material for ink-receiving layer, which is the same as the coating material for ink-receiving layer 22, except for EHA used in Synthesis Example 6 being changed to BA, was applied to the sealer-coated surface of the substrate by airless spray so as to have a coating volume of 120 g/m$^2$ (corresponding to a dry film thickness of 30 μm). Thereafter, the coating material was dried at 100° C. for 3 minutes to form an ink-receiving layer. Measurement of substrate temperatures was performed using a non-contact infrared radiation thermometer (ISK-870011, manufactured by AS ONE).

3. Ink Layer

After preparation of the ink-receiving layer, with the substrate temperature being adjusted to 50 to 60° C., a gradation pattern (a solid image in which recording densities were increased in a stepwise manner of 20% from 10% to 100%) of the UV ink (black) prepared above was formed using an inkjet printer. At this time, the temperature of the ink at a time of ink ejection was 45° C. After formation of the pattern, the ink was cured by irradiation with ultraviolet radiation having an integrated light amount of 300 mJ/cm$^2$ with a peak illuminance of 800 mW/cm$^2$, using a metal halide lamp. Measurement of substrate temperatures was performed using a non-contact infrared radiation thermometer (ISK-870011, manufactured by AS ONE).

4. Surface Protecting Layer

After curing the ink, in a state in which the surface temperature of the cured coating film was adjusted to be 50° C., the above-described clear coating material was applied so that the coating amount was 80 g/m$^2$ (corresponding to a dry film thickness of 25 μm). After the application, the clear coating material was dried at 80° C. for 20 minutes to form a surface protecting layer. Note that, measurement of surface temperatures was performed using a non-contact infrared ray radiation thermometer (ISK-870011, manufactured by AS ONE).

[Evaluation Method]

Chromogenic properties, adhesiveness, water resistance and weather resistance of the printed matters after surface protecting layer lamination, as well as monomer dissipation rates of the printed matters after ink layer lamination and the monomer dissipation rates of the printed matters after surface protecting layer lamination were evaluated by the following methods. Measurement results are shown in Tables 13 to 18. Note that evaluations were made under an atmosphere of 23° C. and 50% RH, unless otherwise specified.

(1) Chromogenic Property

Gradation patterns 1 day after preparation of decoration test boards were evaluated for chromogenic property by observation with the naked eye and a microscope. Evaluation criteria are as follows.

A: Original color of the ink is printed uniformly without unevenness or bleeding.

C: There is unevenness, rubbing, and/or bleeding in the gradation pattern.

(2) Adhesiveness (According to JIS K5600-5-6: 1999)

Incisions were made into each of the prepared printed matters using a cutter knife at 2 mm intervals in length and width to prepare 100 cells, and Cellotape (registered trademark) peeling test was performed. Evaluation criteria are as follows.

A: Classes 0 to 1
B: Class 2
C: Classes 3 to 5

Note that classes 0 to 5 described in Section 8.3 of JIS K 5600-5-6:1999 are as follows.

Class 0: Edges of the cut are perfectly smooth and no peeling is observed in any cell.
Class 1: A residual rate of the laminated coating film is 95 to 99%.
Class 2: A residual rate of the laminated coating film is 85% or more and less than 95%
Class 3: A residual rate of the laminated coating film is 65% or more and less than 85%
Class 4: A residual rate of the laminated coating film is 0% or more and less than 65%
Class 5: A peeling degree which cannot be classified even into Class 4.

(3) Water Resistance (According to JIS K 5600-6-2: 1999)

Each of the prepared printed matters was immersed in a constant temperature water bath kept at 40° C., taken out after 240 hours to dry. Thereafter, the appearance of generated swelling, whitening, etc. were observed, and adhesiveness was evaluated in the same manner as in the method of (2) above. Evaluation criteria are as follows.

AA: There is no abnormal appearance such as swelling, whitening, etc. and adhesiveness is class 0.
A: There is no abnormal appearance such as swelling, whitening, etc., and adhesiveness is class 1.
B: There is no abnormal appearance such as swelling, whitening, etc. and adhesiveness is class 2 or 3.
C: Abnormal appearance such as swelling, whitening, etc. is observed. Adhesiveness is class 4 or 5.

(4) Accelerated Weather Resistance (According to JIS K 5600-7-7: 2008)

Each of the prepared printed matters was subjected to accelerated weatherability test according to a xenon lamp method described in JIS K 5600-7-7 using Weather-Ometer Ci4000 (manufactured by Atlas). The test was carried out up to test time of 1,000 hours, and the appearance of the coating film was visually evaluated. Adhesiveness was evaluated in the same manner as in the method of (2) above. Evaluation criteria are as follows.

A: There is no abnormal appearance such as swelling, chalking, cracking, etc. and adhesiveness is class 0 or 1.
B: There is no abnormal appearance such as swelling, chalking, cracking, etc. and adhesiveness is class 2 or 3.
C: Abnormal appearance such as swelling, chalking, cracking etc. are observed. Adhesiveness is class 4 or 5.

(5) Monomer Dissipation Rate

A monomer dissipation rate of each of the printed matters after ink layer lamination and that of each of the printed matters after surface protecting layer lamination were calculated by gas chromatography measurement using a small chamber, according to JIS A 1901: 2015. When the monomer dissipation rate is 1.0 $\mu g/m^2 \cdot hr$ or less, the monomer dissipation amount can be said to be small.

1. An inside of a 20 L chamber was set at a temperature of 28° C., a humidity of 50% RH, and a ventilation frequency of 0.5 times/hr, and stabilized for 1 hour.
2. Air in the chamber was collected to determine a detection amount of monomers (background) before setting the test piece.
3. A test piece was set in the chamber and allowed to dissipate monomers for 2 hours. Measurement was made at 1 hour after the test piece preparation when the test piece temperature was lowered to 28° C.
4. Air in the chamber was collected, to determine a detection amount of monomers after the test piece was placed.
5. A monomer concentration was calculated using a calibration curve prepared from a standard reagent, and the dissipation rate of each monomer was calculated from the following formula.

$$EFa = Ct \times n / L \quad \text{(Formula)}$$

EFa: monomer dissipation rate per unit area ($\mu g/m^2 \cdot hr$)
n: Ventilation frequency (times/hr)
Ct: concentration of monomers in the chamber at elapsed time t
L: Sample load ratio ($m^2/m^3$) (ratio of a volume of the small chamber with respect to a surface area of the test piece)

<Evaluation Results>

TABLE 13

| | Example 1 | Example 2 | Example 3 | Example 4 | Example 5 | Example 6 | Example 7 | Comparative Example 1 |
|---|---|---|---|---|---|---|---|---|
| Printing layer | Ink 1 | Ink 2 | Ink 3 | Ink 4 | Ink 5 | Ink 6 | Ink 9 | Ink 10 |
| SP value of monomer | 10.28 | 10.05 | 10.09 | 10.06 | 10.06 | 9.88 | 9.69 | 9.41 |
| Surface protecting layer | Clear 2 | Clear 2 | Clear 2 | Clear 2 | Clear 2 | Clear 2 | Clear 2 | Clear 2 |
| SP value of organic solvent component | 10.38 | 10.38 | 10.38 | 10.38 | 10.38 | 10.38 | 10.38 | 10.38 |
| \|SP value of monomer − SP value of organic solvent component\| | 0.10 | 0.33 | 0.29 | 0.32 | 0.32 | 0.50 | 0.69 | 0.97 |
| Monomer dissipation rate of printing layer | 5.0 | 5.4 | 5.8 | 3.5 | 8.5 | 4.0 | 4.5 | 5.5 |

TABLE 13-continued

|  |  | Example 1 | Example 2 | Example 3 | Example 4 | Example 5 | Example 6 | Example 7 | Comparative Example 1 |
|---|---|---|---|---|---|---|---|---|---|
| Monomer dissipation rate of surface protecting layer | | 0.1 | 0.3 | 0.2 | 0.3 | 0.3 | 0.5 | 0.9 | 1.5 |
| Printing evaluation | Chromogenic property | A | A | A | A | A | A | A | A |
| Durability of printed matter | Adhesiveness | A | A | A | A | A | A | B | B |
| | Water resistance | A | A | A | A | A | A | A | A |
| | Weather resistance | A | A | A | A | A | A | A | A |

TABLE 14

|  |  | Example 8 | Example 9 | Example 10 | Example 11 | Example 12 | Example 13 | Example 14 | Example 15 |
|---|---|---|---|---|---|---|---|---|---|
| Printing layer | | Ink 1 | Ink 2 | Ink 3 | Ink 4 | Ink 5 | Ink 6 | Ink 9 | Ink 10 |
| SP value of monomer | | 10.28 | 10.05 | 10.09 | 10.06 | 10.06 | 9.88 | 9.69 | 9.41 |
| Surface protecting layer | | Clear 3 | Clear 3 | Clear 3 | Clear 3 | Clear 3 | Clear 3 | Clear 3 | Clear 3 |
| SP value of organic solvent component | | 10.00 | 10.00 | 10.00 | 10.00 | 10.00 | 10.00 | 10.00 | 10.00 |
| \|SP value of monomer − SP value of organic solvent component\| | | 0.28 | 0.05 | 0.09 | 0.06 | 0.06 | 0.12 | 0.31 | 0.59 |
| Monomer dissipation rate of printing layer | | 5.0 | 5.4 | 5.8 | 3.5 | 8.5 | 4.0 | 4.5 | 5.5 |
| Monomer dissipation rate of surface protecting layer | | 0.2 | 0.1 | 0.1 | 0.1 | 0.1 | 0.2 | 0.3 | 0.6 |
| Printing evaluation | Chromogenic property | A | A | A | A | A | A | A | A |
| Durability of printed matter | Adhesiveness | A | A | A | A | A | A | B | B |
| | Water resistance | A | A | A | A | A | A | A | A |
| | Weather resistance | A | A | A | A | A | A | A | A |

TABLE 15

|  |  | Example 16 | Example 17 | Example 18 | Example 19 | Example 20 | Example 21 | Example 22 | Example 23 |
|---|---|---|---|---|---|---|---|---|---|
| Printing layer | | Ink 1 | Ink 2 | Ink 3 | Ink 4 | Ink 5 | Ink 6 | Ink 9 | Ink 10 |
| SP value of monomer | | 10.28 | 10.05 | 10.09 | 10.06 | 10.06 | 9.88 | 9.69 | 9.41 |
| Surface protecting layer | | Clear 4 | Clear 4 | Clear 4 | Clear 4 | Clear 4 | Clear 4 | Clear 4 | Clear 4 |
| SP value of organic solvent component | | 9.79 | 9.79 | 9.79 | 9.79 | 9.79 | 9.79 | 9.79 | 9.79 |
| \|SP value of monomer − SP value of organic solvent component\| | | 0.49 | 0.26 | 0.30 | 0.27 | 0.27 | 0.09 | 0.10 | 0.38 |
| Monomer dissipation rate of printing layer | | 5.0 | 5.4 | 5.8 | 3.5 | 8.5 | 4.0 | 4.5 | 5.5 |
| Monomer dissipation rate of surface protecting layer | | 0.5 | 0.2 | 0.3 | 0.2 | 0.2 | 0.1 | 0.1 | 0.3 |
| Printing evaluation | Chromogenic property | A | A | A | A | A | A | A | A |
| Durability of printed matter | Adhesiveness | A | A | A | A | A | A | B | B |
| | Water resistance | A | A | A | A | A | A | A | A |
| | Weather resistance | A | A | A | A | A | A | A | A |

TABLE 16

|  |  | Comparative Example 2 | Comparative Example 3 | Comparative Example 4 | Comparative Example 5 | Comparative Example 6 | Example 24 | Example 25 | Example 26 |
|---|---|---|---|---|---|---|---|---|---|
| Printing layer | | Ink 1 | Ink 2 | Ink 3 | Ink 4 | Ink 5 | Ink 6 | Ink 9 | Ink 10 |
| SP value of monomer | | 10.28 | 10.05 | 10.09 | 10.06 | 10.06 | 9.88 | 9.69 | 9.41 |
| Surface protecting layer | | Clear 5 | Clear 5 | Clear 5 | Clear 5 | Clear 5 | Clear 5 | Clear 5 | Clear 5 |
| SP value of organic solvent component | | 9.23 | 9.23 | 9.23 | 9.23 | 9.23 | 9.23 | 9.23 | 9.23 |
| \|SP value of monomer − SP value of organic solvent component\| | | 1.05 | 0.82 | 0.86 | 0.83 | 0.83 | 0.65 | 0.46 | 0.18 |
| Monomer dissipation rate of printing layer | | 5.0 | 5.4 | 5.8 | 3.5 | 8.5 | 4.0 | 4.5 | 5.5 |
| Monomer dissipation rate of surface protecting layer | | 1.8 | 1.2 | 1.4 | 1.2 | 1.3 | 0.8 | 0.5 | 0.2 |
| Printing evaluation | Chromogenic property | A | A | A | A | A | A | A | A |

TABLE 16-continued

|  | | Comparative Example 2 | Comparative Example 3 | Comparative Example 4 | Comparative Example 5 | Comparative Example 6 | Example 24 | Example 25 | Example 26 |
|---|---|---|---|---|---|---|---|---|---|
| Durability of printed matter | Adhesiveness | A | A | A | A | A | A | B | B |
| | Water resistance | A | A | A | A | A | A | A | A |
| | Weather resistance | A | A | A | A | A | A | A | A |

TABLE 17

|  | | Example 27 | Example 28 | Example 29 | Example 30 | Example 31 | Example 32 | Example 33 | Example 34 | Example 35 | Example 36 |
|---|---|---|---|---|---|---|---|---|---|---|---|
| Printing layer | | Ink 1 | Ink 9 | Ink 1 | Ink 6 | Ink 9 | Ink 1 | Ink 9 | Ink 1 | Ink 6 | Ink 9 |
| SP value of monomer | | 10.28 | 9.69 | 10.28 | 9.88 | 9.69 | 10.28 | 9.69 | 10.28 | 9.88 | 9.69 |
| Surface protecting layer | | Clear 6 | Clear 6 | Clear 7 | Clear 7 | Clear 7 | Clear 8 | Clear 8 | Clear 9 | Clear 9 | Clear 9 |
| SP value of organic solvent component | | 10.38 | 10.38 | 10.00 | 10.00 | 10.00 | 10.38 | 10.38 | 10.00 | 10.00 | 10.00 |
| |SP value of monomer − SP value of organic solvent component| | | 0.10 | 0.69 | 0.28 | 0.12 | 0.31 | 0.10 | 0.69 | 0.28 | 0.12 | 0.31 |
| Monomer dissipation rate of printing layer | | 5.0 | 4.5 | 5.0 | 4.0 | 4.5 | 5.0 | 4.5 | 5.0 | 4.0 | 4.5 |
| Monomer dissipation rate of surface protecting layer | | 0.1 | 0.9 | 0.2 | 0.2 | 0.3 | 0.1 | 0.9 | 0.2 | 0.2 | 0.3 |
| Printing evaluation | Chromogenic property | A | A | A | A | A | A | A | A | A | A |
| Durability of printed matter | Adhesiveness | A | B | A | A | B | A | B | A | A | B |
| | Water resistance | A | A | A | A | A | A | A | A | A | A |
| | Weather resistance | A | A | A | A | A | A | A | A | A | A |

TABLE 18

|  | | Comparative Example 7 | Comparative Example 8 | Comparative Example 9 | Comparative Example 10 |
|---|---|---|---|---|---|
| Printing layer | | Ink 1 | Ink 6 | Ink 9 | Ink 1 |
| SP value of monomer | | 10.28 | 9.88 | 9.69 | 10.28 |
| Surface protecting layer | | Clear 1 | Clear 1 | Clear 1 | Clear 10 |
| SP value of organic solvent component | | 11.01 | 11.01 | 11.01 | 10.38 |
| |SP value of monomer − SP value of organic solvent component| | | 0.73 | 1.13 | 1.32 | 0.10 |
| Monomer dissipation rate of printing layer | | 5.0 | 4.0 | 4.5 | 5.0 |
| Monomer dissipation rate of surface protecting layer | | 1.1 | 2.0 | 2.4 | 1.5 |
| Printing evaluation | Chromogenic property | A | A | A | A |
| Durability of printed matter | Adhesiveness | A | A | B | A |
| | Water resistance | A | A | A | B |
| | Weather resistance | A | A | A | B |

As described above, the printed matters of the Examples dissipate a small amount of unreacted monomers, and have an excellent appearance and durability. On the other hand, in Comparative Examples 1 to 9, a difference, |(A)−(B)|, between the solubility parameter (A) of the polymerizable compound and the solubility parameter (B) of the organic solvent component contained in the water-borne coating material exceeded 0.70, resulting in large monomer dissipation rates after surface protecting layer lamination. Further, in Comparative Example 10, in which after a water-borne coating material which forms the surface protecting layer was applied, drying was not performed at a temperature equal to or higher than the glass transition temperature of the surface protecting layer, the monomer dissipation rate of the surface protecting layer was also large.

The invention claimed is:

1. A printed matter formed by laminating an ink-receiving layer having an ink absorption rate of 100% or less on a surface of a substrate, and laminating an ink layer comprising an actinic radiation-curable ink containing a polymerizable compound on a surface of the ink-receiving layer,
wherein, in the ink layer, the polymerizable compound has a glass transition temperature of −45° C. to 25° C., and a ratio of a monofunctional monomer contained in the polymerizable compound is 50% by mass or more, and
the ink-receiving layer is formed using a water-borne coating material including a crosslinking agent.

2. The printed matter according to claim 1, wherein the ink-receiving layer comprises a polymer containing at least one structural unit derived from an ethylenically unsaturated monomer having a solubility parameter of 9.50 to 13.0, in a content of 25 to 85% by mass.

3. The printed matter according to claim 1, wherein an elongation rate of the ink-receiving layer is 10 to 30%.

4. A printed matter comprising:
a substrate;
an ink-receiving layer on the substrate, the ink-receiving layer being made with a water-borne coating material including a crosslinking agent, the ink-receiving layer having an ink absorption rate of 100% or less;

an ink layer comprising an actinic radiation-curable ink containing a polymerizable compound; and a surface-protecting layer laminated over the ink layer, wherein, in the ink layer, a ratio of a monofunctional monomer contained in the polymerizable compound is 50% by mass or more, and wherein a monomer dissipation rate of the ink layer is 10.0 μg/m²·hr or less and the monomer dissipation rate after the surface protecting layer is formed is 1.0 μg/m²·hr or less.

5. The printed matter according to claim 4, wherein the ink layer is provided on the ink-receiving layer, the ink-receiving layer comprising a polymer containing at least one structural unit derived from an ethylenically unsaturated monomer having a solubility parameter between 9.50 and 13.0, in a content of 25 to 85% by mass.

6. The printed matter according to claim 4, wherein an absolute value of a difference between a mass average value of solubility parameters of polymerizable monomers, as the polymerizable compound, contained in the actinic radiation-curable ink and a solubility parameter of an organic solvent component contained in a composition forming the surface protecting layer is 0.70 or less.

7. The printed matter according to claim 2, wherein an elongation rate of the ink-receiving layer is 10 to 30%.

8. The printed matter according to claim 5, wherein an absolute value of a difference between a mass average value of solubility parameters of polymerizable monomers, as the polymerizable compound, contained in the actinic radiation-curable ink and a solubility parameter of an organic solvent component contained in a composition forming the surface protecting layer is 0.70 or less.

* * * * *